(12) United States Patent
Takahara et al.

(10) Patent No.: US 8,046,130 B2
(45) Date of Patent: Oct. 25, 2011

(54) MOTION CONTROL SYSTEM FOR VEHICLE

(75) Inventors: Yasuo Takahara, Anjo (JP); Haruo Arakawa, Toyota (JP); Takayuki Takeshita, Anjo (JP); Chihiro Nitta, Anjo (JP)

(73) Assignee: Advics Co., Ltd., Kairya, Aichi Pref. (JP)

( * ) Notice: Subject to any disclaimer, the term of this patent is extended or adjusted under 35 U.S.C. 154(b) by 461 days.

(21) Appl. No.: 12/377,077

(22) PCT Filed: Jan. 25, 2008

(86) PCT No.: PCT/JP2008/051613
§ 371 (c)(1),
(2), (4) Date: Feb. 10, 2009

(87) PCT Pub. No.: WO2008/114538
PCT Pub. Date: Sep. 25, 2008

(65) Prior Publication Data
US 2010/0168975 A1  Jul. 1, 2010

(30) Foreign Application Priority Data
Feb. 21, 2007  (JP) ................. 2007-040623

(51) Int. Cl.
*B60T 8/1755* (2006.01)
(52) U.S. Cl. .................. 701/38; 701/79; 303/155
(58) Field of Classification Search .......... 701/70, 701/78, 79, 38; 280/5.507; 303/155
See application file for complete search history.

(56) References Cited

FOREIGN PATENT DOCUMENTS

| DE | 41 18 461 A1 | 12/1991 |
|---|---|---|
| DE | 101 31 323 A1 | 5/2002 |
| EP | 0 823 360 A2 | 2/1998 |
| GB | 2 245 323 A | 1/1992 |
| JP | 6-064436 A | 3/1994 |
| JP | 11-151921 A | 6/1999 |

OTHER PUBLICATIONS

Form PCT/ISA/210 (International Search Report) dated Aug. 20, 2008.
Form PCT/ISA/237 (Written Opinion of the International Searching Authority) dated Aug. 20, 2008.

*Primary Examiner* — Kevin Hurley
(74) *Attorney, Agent, or Firm* — Buchanan Ingersoll & Rooney PC

(57) ABSTRACT

A motion control system is applied to a vehicle, which has front wheel side suspensions with an anti-dive geometry and rear wheel side suspensions with an anti-lift geometry. A degree of an anti-lift effect of the anti-lift geometry is larger than a degree of an anti-dive effect of the anti-dive geometry. Normally, a controller controls a hydraulic unit such that a brake force distribution between front wheels and rear wheels during a braking-period is adjusted to a basic distribution. In contrast, in a state where abrupt application of brakes is started, the controller controls the hydraulic unit such that the brake force distribution is adjusted to a first distribution, at which a brake force respectively applied to the rear wheels is larger than that of the basic distribution only for a predetermined short time period upon starting of the application of the brakes.

6 Claims, 10 Drawing Sheets

$\theta f < \theta r$
$\Delta Fad2 < \Delta Fal2$

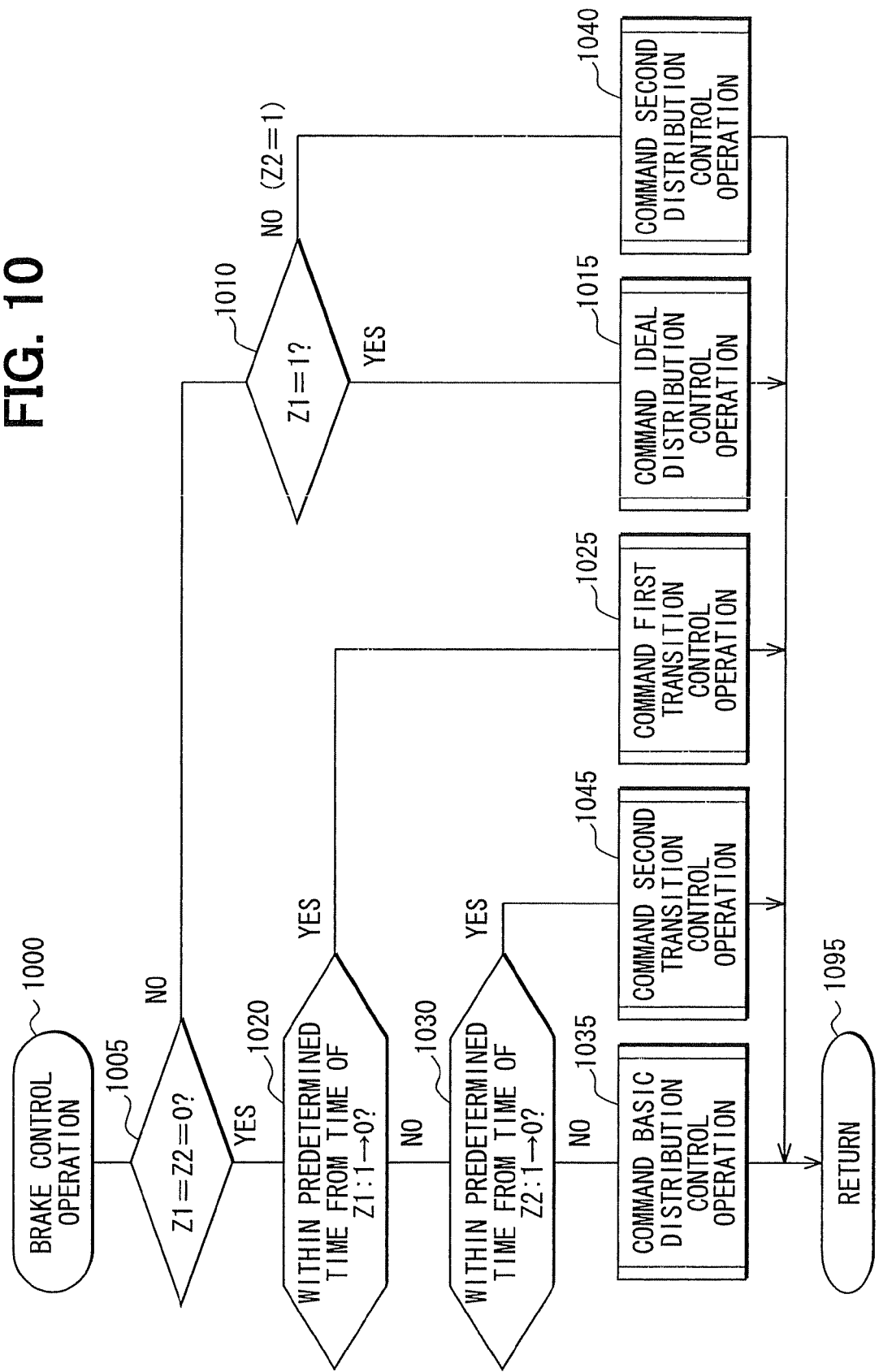

MOTION CONTROL SYSTEM FOR VEHICLE

CROSS REFERENCE TO RELATED APPLICATION

This application is based on and incorporates herein by reference Japanese Patent Application No. 2007-040623 filed on Feb. 21, 2007.

TECHNICAL FIELD

The present invention relates to a motion control system for a vehicle.

BACKGROUND ART

Front wheel side suspensions, which have an anti-dive geometry, and rear wheel side suspensions, which have an anti-lift geometry, are well known in the art to limit pitching of the vehicle, which occurs during a braking period of applying brakes. With such front and rear wheel side suspensions, an anti-dive effect, which limits diving of a vehicle body (a phenomenon of sinking of a front side of the vehicle body) during the braking period, and an anti-lift effect, which limits lifting of the vehicle body (a phenomenon of floating of a rear side of the vehicle body) during the braking period, are implemented, so that the pitching is limited. Hereinafter, the terms "anti-dive" and "anti-lift" may also be collectively referred to as "anti-pitching".

It is conceivable to adapt an anti-pitching geometry, which shows the large anti-pitching effect for the brake force applied to the vehicle wheels, to increase a degree of limiting the pitching. However, when the anti-pitching geometry, which shows an excessively large anti-pitching effect, is adapted, a degree of conducting a vehicle's front-to-rear directional force, which is initially applied to ground contact points of the vehicle wheels (tires) at the time of driving the vehicle on, for example, a rough road, to the vehicle body is increased as a vertical force. This may result in deterioration of the ride feeling of an occupant(s) of the vehicle. In other words, the ride feeling of the occupant(s) is deteriorated during the time of driving the vehicle without applying the brakes (non-braking period).

Thereby, it is required to adapt the anti-pitching geometry, which does not show the large anti-pitching effect, to maintain the good ride feeling of the occupant(s) during the non-braking period and which effectively limits the pitching during the braking period. In view of this, for example, in Japanese Unexamined Patent Publication No. H11-151921 and Japanese Unexamined Patent Publication No. H06-64436, strokes and locations of suspension components, which define the anti-pitching geometry, are changed during the braking period to increase the anti-pitching effect of the anti-pitching geometry. In this way, the pitching is effectively limited during the braking period while maintain the good ride feeling of the occupant(s) during the non-braking period.

However, in the systems described in Japanese Unexamined Patent Publication No. H11-151921 and Japanese Unexamined Patent Publication No. H06-64436, the strokes and the locations of the suspension components are changed during the braking period, and thereby a dedicated mechanism for implementing this needs to be installed in the suspensions. This will disadvantageously increase the manufacturing costs and deteriorate the installability of the system to the vehicle and manufacturability of the system.

DISCLOSURE OF THE INVENTION

The present invention addresses the above disadvantage. Thus, it is an objective of the present invention to provide a motion control system of a vehicle, which can effectively limit the pitching during the braking period of the vehicle and can maintain the good ride feeling of the occupant(s) during the non-braking period of the vehicle without providing a dedicated mechanism in suspensions of the vehicle.

To achieve the objective of the present invention, there may be provided a motion control system for a vehicle, including at least one front wheel side suspension, at least one rear wheel side suspension, a brake control apparatus, a brake operating member, a basic distribution implementing means and at least one of a first distribution control means and a second distribution control means. The at least one front wheel side suspension is provided to a plurality of front wheels of the vehicle and has an anti-dive geometry. The at least one rear wheel side suspension is provided to a plurality of rear wheels of the vehicle and has an anti-lift geometry. A change in a degree of an anti-lift effect of the anti-lift geometry relative to a change in a rear wheel brake force respectively applied to the plurality of rear wheels is larger than a change in a degree of an anti-dive effect of the anti-dive geometry relative to a change in a front wheel brake force respectively applied to the plurality of front wheels. The brake control apparatus is operable to independently apply and control the front wheel brake force and the rear wheel brake force. The basic distribution implementing means is for controlling the brake control apparatus during operation of a brake operating member of the vehicle by a driver. The basic distribution implementing means controls the brake control apparatus such that a sum of the front wheel brake force and the rear wheel brake force becomes a demanded value, which corresponds to an amount of operation of the brake operating member by the driver, and a brake force distribution between the plurality of front wheels and the plurality of rear wheels becomes a basic distribution. The basic distribution is one of a distribution, which is equal to an ideal distribution that implements simultaneous locking of the plurality of front wheels and the plurality of rear wheels, and a distribution, at which the rear wheel brake force is smaller than that of the ideal distribution. The first distribution control means is for controlling the brake control apparatus such that the sum of the front wheel brake force and the rear wheel brake force becomes the demanded value, and the brake force distribution between the plurality of front wheels and the plurality of rear wheels becomes a first distribution, at which the rear wheel brake force is larger than that of the basic distribution. The first distribution control means starts the controlling of the brake control apparatus when a rate of change in the amount of operation of the brake operating member for applying the front and rear wheel brake forces becomes larger than a predetermined rate. The first distribution control means terminates the controlling of the brake control apparatus when an angular acceleration of a pitch angle of a vehicle body of the vehicle is changed from a positive range to a negative range. The pitch angle of the vehicle body is defined such that when a front side of the vehicle body is tilted downward, the pitch angle of the vehicle body is in the positive range. The second distribution control means is for controlling the brake control apparatus such that the sum of the front wheel brake force and the rear wheel brake force becomes the demanded value, and the brake force distribution between the plurality of front wheels and the plurality of rear wheels becomes a second distribution, at which the rear wheel brake force is smaller than that of the basic distribution. The second distribution control means starts the controlling of the brake control apparatus when a rate of change in the amount of operation of the brake operating member for releasing the front and rear brake forces becomes larger than a predetermined rate.

The second distribution control means terminates the controlling of the brake control apparatus when the angular acceleration of the pitch angle of the vehicle body is changed from the negative range to the positive range. The basic distribution may be a distribution, at which the rear wheel brake force is kept relatively small, so that locking of the rear wheels will not occur.

With the above construction, during the braking period (the operating period of the brake operating member), the brake force respectively applied to the plurality of front wheels and the brake force respectively applied to the plurality of rear wheels are normally adjusted such that the sum of the brake force respectively applied to the plurality of front wheels and the brake force respectively applied to the plurality of rear wheels becomes the demanded value, which corresponds to the amount of operation of the brake operating member by the driver, and the brake force distribution between the plurality of front wheels and the plurality of rear wheels becomes the basic distribution.

In contrast, in the state where the increasing rate of the amount of operation of the brake operating member (e.g., an amount of an operational force or an operational stroke) at the time of starting the operation of the brake operating member by the driver is larger than the predetermined rate, i.e., in the state where the pitch angle shows a large disorder at the time of starting abrupt application of brakes, the brake force respectively applied to the plurality of front wheels and the brake force respectively applied to the plurality of rear wheels are normally adjusted such that the sum of the brake force respectively applied to the plurality of front wheels and the brake force respectively applied to the plurality of rear wheels is maintained to the demanded value, and the brake force distribution between the plurality of front wheels and the plurality of rear wheels becomes the first distribution, at which the brake force respectively applied to the plurality of the rear wheels is larger than that of the basic distribution. That is, in the first distribution, a portion of the brake force to be respectively applied to the plurality of front wheels is transferred to the brake force to be respectively applied to the plurality of rear wheels. Thus, the brake force respectively applied to the plurality of front wheels is decreased, and the brake force respectively applied to the plurality of rear wheels is increased by the amount, which is equal to the amount of decrease in the brake force respectively applied to the plurality of front wheels. The sum of the brake force respectively applied to the plurality of front wheels and the brake force respectively applied to the plurality of rear wheels is maintained to the same vale (=a demanded value), which is the same as that of the basic distribution.

Here, in general, the anti-pitching effect (an anti-pitching force, an anti-pitching moment) of the anti-pitching geometry is increased as the brake force respectively applied to the wheels is increased. In addition, as described above, the change in the degree of the anti-lift effect (an anti-lift force, an anti-lift moment) of the anti-lift geometry is larger than the change in the degree of the anti-dive effect (an anti-dive force, an anti-dive moment).

Therefore, the amount of increase in the degree of the anti-lift effect caused by the increase in the brake force respectively applied to the plurality of rear wheels upon changing of the basic distribution to the first distribution becomes larger than the amount of decrease in the degree of the anti-dive effect caused by the decrease in the brake force respectively applied to the plurality of front wheels upon changing of the basic distribution to the first distribution. That is, when the entire vehicle is viewed, in the state of the first distribution, the anti-pitching effect is increased in comparison to that of the basic distribution. Specifically, the increasing of the pitch angle becomes difficult.

With the above construction, in the state where the pitch angle may possibly show the large disorder upon starting of the abrupt application of the brakes, the brake force distribution between the plurality of front wheels and the plurality of rear wheels is changed from the basic distribution to the first distribution. In this way, the anti-pitching effect can be increased to limit the increase in the pitch angle without a need for providing the dedicated mechanism to the suspensions. As a result, the pitching (the disorder in the pitch angle) during the braking period is effectively limited while maintaining the good ride feeling of the occupant(s) during the non-braking period by adapting the suspensions, which have the anti-pitching geometry that does not show the large anti-pitching effect.

In addition, with the above construction, the time period for adjusting the brake force distribution between the plurality of front wheels and the plurality of rear wheels to the first distribution is limited to the time period between the time of starting the abrupt application of the brakes and the time of changing of the angular acceleration of the pitch angle from the positive range to the negative range (i.e., the time of changing from the increasing state of the angular speed of the pitch angle to the decreasing state of the angular speed of the pitch angle). Here, as will be described below, when the time period for adjusting the brake distribution between the plurality of front wheels and the plurality of rear wheels is limited in the above described manner, it is possible to accelerate convergence of the pitching motion (see FIGS. 5A to 5C). In this way, the brake distribution between the plurality of front wheels and the plurality of rear wheels can be returned to the basic distribution in the early stage while accelerating the convergence of the pitching motion.

Also, with the above construction, the basic distribution is set as the distribution, which is equal to the ideal distribution for locking the plurality of front wheels and the plurality of rear wheels simultaneously, or is set as the distribution, at which the brake force respectively applied to the plurality of the rear wheels is smaller than that of the ideal distribution. Thus, it is possible to limit occurrence of the locking of the plurality of rear wheels in advance to the locking of the plurality of front wheels during the time period of controlling the brake force distribution between the plurality of front wheels and the plurality of rear wheels to the basic distribution.

Furthermore, with the second distribution control means, in the state where the decreasing rate of the amount of operation of the brake operating member (e.g., an amount of an operational force or an operational stroke) during the operation of the brake operating member by the driver is smaller than the predetermined rate, i.e., in the state where the pitch angle shows a large disorder at the time of starting abrupt release of the brakes, the brake force distribution between the plurality of front wheels and the plurality of rear wheels is changed to the second distribution, at which the brake force respectively applied to the plurality of the rear wheels is smaller than that of the basic distribution. Specifically, in the state of the second distribution, a portion of the brake force to be respectively applied to the plurality of rear wheels is transferred to the brake force to be respectively applied to the plurality of front wheels. Thus, the brake force respectively applied to the plurality of rear wheels is decreased, and the brake force respectively applied to the plurality of front wheels is increased by the amount, which is equal to the amount of decrease in the brake force respectively applied to the plurality of rear wheels. The sum of the brake force respectively applied to the plurality of front wheels and the brake force respectively applied to the plurality of rear wheels is maintained to the same vale (=the demanded value), which is the same as that of the basic distribution.

Therefore, the amount of decrease in the degree of the anti-lift effect caused by the decrease in the brake force respectively applied to the plurality of rear wheels upon changing of the basic distribution to the second distribution becomes larger than the amount of increase in the degree of the anti-dive effect caused by the increase in the brake force respectively applied to the plurality of front wheels upon changing of the basic distribution to the second distribution. That is, when the entire vehicle is viewed, in the state of the second distribution, the anti-pitching effect is decreased in comparison to that of the basic distribution. Specifically, the decreasing of the pitch angle becomes difficult.

With the above construction, in the state where the pitch angle may possibly show the large disorder upon starting of the abrupt release of the brakes, the brake force distribution between the plurality of front wheels and the plurality of rear wheels is changed from the basic distribution to the second distribution. In this way, the anti-pitching effect can be decreased to limit the decrease in the pitch angle without a need for providing the dedicated mechanism to the suspensions. As a result, the pitching (the disorder in the pitch angle) during the braking period is effectively limited.

In addition, with the above construction, the time period for adjusting the brake force distribution between the plurality of front wheels and the plurality of rear wheels to the second distribution is limited to the time period between the time of starting the abrupt release of the brakes and the time of changing of the angular acceleration of the pitch angle from the negative range to the positive range (i.e., the time of changing from the decreasing state of the angular speed of the pitch angle to the increasing state of the angular speed of the pitch angle). Here, as will be described below, it is possible to accelerate convergence of the pitching motion (see FIGS. 7A-7C).

BRIEF DESCRIPTION OF THE DRAWINGS

The invention, together with additional objectives, features and advantages thereof, will be best understood from the following description, the appended claims and the accompanying drawings in which:

FIG. 10 is a flowchart showing a routine for a brake control operation executed by the CPU shown in FIG. 1;

BEST MODES FOR CARRYING OUT THE INVENTION

Figure 1:
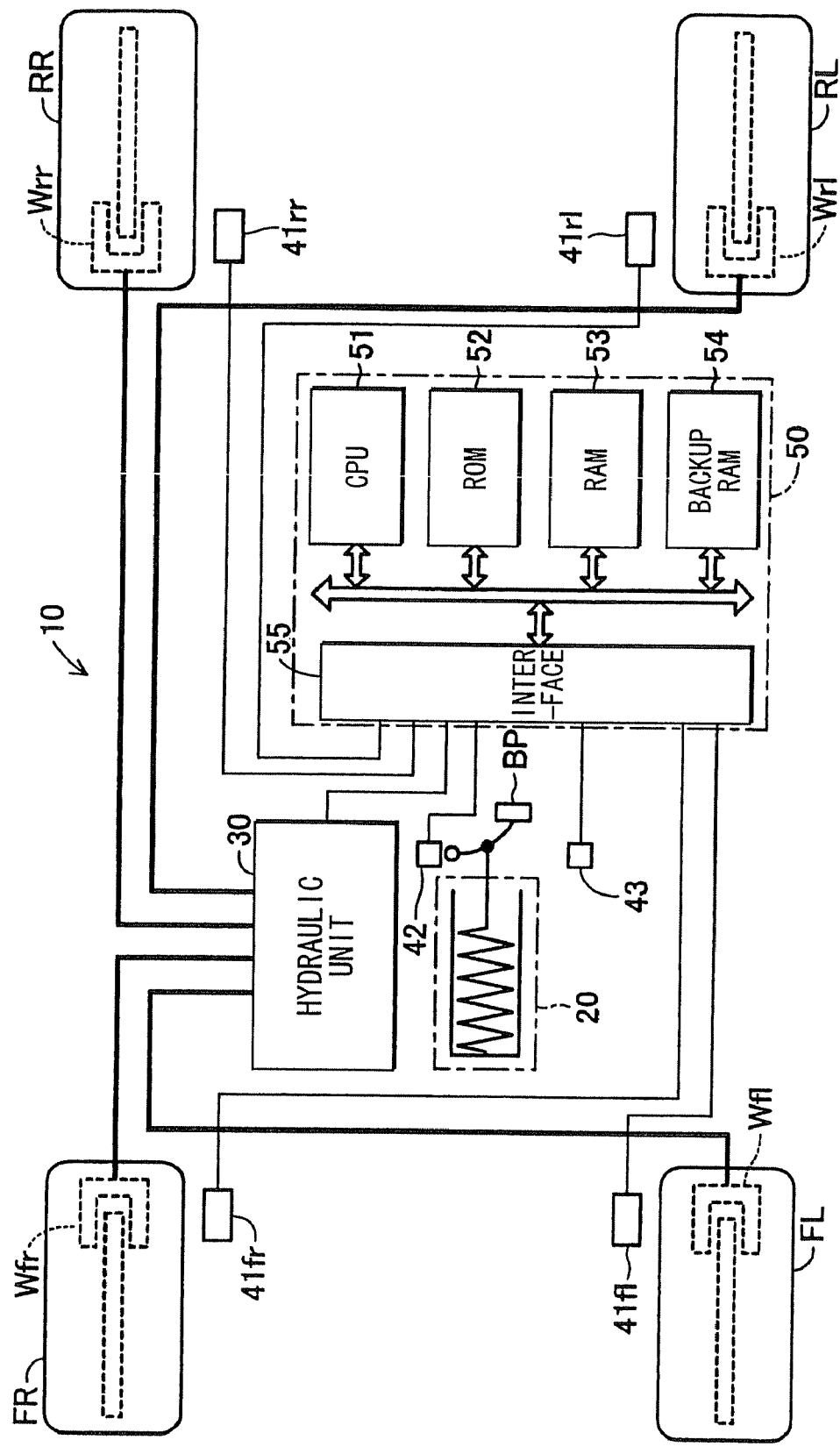
FIG. 1 is a schematic structural diagram of a vehicle, in which a vehicle motion control system according to an embodiment of the present invention is implemented.

A vehicle motion control system according to an embodiment of the present invention will be described with reference to the accompanying drawings. FIG. 1 shows a schematic structure of a vehicle, in which the vehicle motion control system 10 of the present embodiment is installed.

In the vehicle motion control system 10, a brake-by-wire system is provided, and a brake pedal BP (a brake operating member) and a brake fluid pressure circuit are separated. The vehicle motion control system 10 includes a stroke simulator mechanism 20 and a hydraulic unit 30. The hydraulic unit 30 applies a brake fluid hydraulic pressure to generate a brake force at respective vehicle wheels FL, FR, RL, RR.

The stroke simulator mechanism 20 includes a known reaction force applying mechanism, which applies an appropriate reaction force (=brake pedal pressing force Fp) that corresponds to a stroke of the brake pedal BP, to the brake pedal BP. The reaction force applying mechanism will not be described in detail for the sake of simplicity. With the reaction force applying mechanism, a driver of the vehicle can obtain an appropriate brake pedal feeling at the time of operating the brake pedal BP.

The hydraulic unit 30 has a known structure, which includes a plurality of solenoid valves, a hydraulic pump and a motor (not shown). Furthermore, the hydraulic unit 30 can individually adjust the hydraulic pressure (hereinafter, referred to as wheel cylinder hydraulic pressure Pwfl, Pwfr, Pwrl, Pwrr) of wheel cylinders Wfl, Wfr, Wrl, Wrr of the vehicle wheels FL, FR, RL, RR.

The vehicle motion control system 10 further includes wheel speed sensors 41*fl*, 41*fr*, 41*rl*, 41*rr* of an electromagnetic pickup type, a pressing force sensor (pedal force sensor) 42 and a pitch angle sensor 43. Each wheel speed sensor 41*fl*, 41*fr*, 41*rl*, 41*rr* outputs a signal, which has a corresponding frequency that corresponds to the wheel speed of the corresponding one of the wheels FL, FR, RL, RR. The pressing force sensor 42 outputs a signal, which indicates the brake pedal pressing force (pedal force) Fp applied from a foot of the driver against the brake pedal BP. The pitch angle sensor 43 outputs a signal, which indicates a pitch angle $\theta p$ of the vehicle body. The pitch angle $\theta p$ becomes a positive value at the time of tilting the vehicle body forward (i.e., at the time of tilting the front side of the vehicle body downward) and becomes a negative value at the time of tilting the vehicle body backward (i.e., at the time of tilting the rear side of the vehicle body downward).

The vehicle motion control system 10 further includes an electronic controller 50. The controller 50 is a microcomputer that includes a CPU 51, a ROM 52, a RAM 53, a backup RAM 54 and an interface 55, which are interconnected with each other through a bus line. The interface 55 is connected to the wheel speed sensors 41*fl*, 41*fr*, 41*rl*, 41*rr*, the pressing force sensor 42 and the pitch angle sensor 43 to supply signals therefrom to the CPU 51. Also, the interface 55 outputs drive signals to, for example, the solenoid valves of the hydraulic unit 30 and the motor based on a command of the CPU 51.

Figure 2:
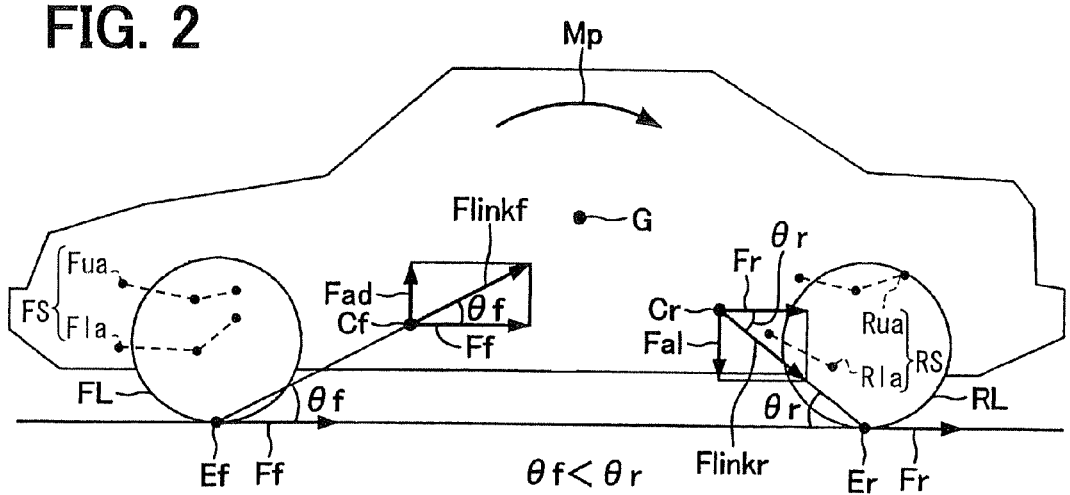
FIG. 2 is a diagram for describing an anti-pitching geometry implemented in the suspensions of the vehicle.

Next, an anti-pitching geometry of suspensions of the vehicle, into which the vehicle motion control system 10 of FIG. 1 (also, referred to as the present system) is installed, will be briefly described with reference to FIG. 2. In FIG. 2, only a front upper arm Fua and a front lower arm Fla of a left one of two front wheel side suspensions (front left and right wheel suspensions) FS and a rear upper arm Rua and a rear lower arm Rla of a left one of two rear wheel side suspensions (rear left and right wheel suspensions) RS are schematically depicted for the sake of simplicity. As shown in FIG. 2, an instantaneous center Cf of the motion of each front wheel FL, FR relative to the vehicle body caused by a stroke of the front wheel side suspension FS is located at a point, which is on an upper side of a ground contact point Ef of the front wheel FL, FR and is on a vehicle body rear side of the ground contact point Ef, as viewed from a lateral side of the vehicle body. The location of the instantaneous center Cf in the lateral side view of the vehicle body changes momentarily according to the amount of stroke of the front wheel side suspension FS.

Now, it is assumed that a line, which connects between the instantaneous center Cf and the ground contact point Ef, is a front wheel side imaginary link. In such a case, a horizontal component Ff of an axial compression force Flinkf, which is applied to the front wheel side imaginary link during the braking period, acts as a front wheel brake force. A vertical component Fad of the compression force Flinkf acts as a lifting force, i.e., anti-dive force, which is exerted by the front wheel side suspension FS to lift the front portion of the vehicle body. As discussed above, each front wheel side suspension FS has the anti-dive geometry, which implements an anti-dive effect during the braking period.

An instantaneous center Cr of the motion of each rear wheel RL, RR relative to the vehicle body caused by a stroke of the corresponding rear wheel side suspension RS is located at a point, which is on an upper side of a ground contact point Er of the rear wheel RL, RR and is on a vehicle body front side of the ground contact point Er, as viewed from the lateral side of the vehicle body. The location of the instantaneous center Cr in the lateral side view of the vehicle body also changes momentarily according to the amount of stroke of the rear wheel side suspension RS.

Now, it is assumed that a line, which connects between the instantaneous center Cr and the ground contact point Er, is a rear wheel side imaginary link. In such a case, a horizontal component Fr of an axial tensile force Flinkr, which is applied to the rear wheel side imaginary link during the braking period, acts as a rear wheel brake force. A vertical component Fal of the tensile force Flinkr acts as a downwardly urging force, i.e., anti-lift force, which is exerted by the rear wheel side suspension RS to downwardly urge the rear portion of the vehicle body. As discussed above, each rear wheel side suspension RS has the anti-lift geometry, which implements an anti-lift effect during the braking period.

As described above, during the braking period, the anti-pitching effect is achieved by the anti-dive effect, which is implemented by the anti-dive geometry of each front wheel side suspension FS, and the anti-lift effect, which is implemented by the anti-lift geometry of each rear wheel side suspension RS. Thereby, anti-pitching moment Mp is generated around a center of gravity G of the vehicle. As a result, the pitching is limited during the braking period.

Now, an angle, which is defined between the front wheel side imaginary link and the horizontal line in the lateral side view of the vehicle body, is denoted as $\theta f$. Furthermore, an angle, which is defined between the rear wheel side imaginary link and the horizontal line in the lateral side view of the vehicle body, is denoted as $\theta r$. Here, the above anti-dive force Fad and the above anti-lift force Fal are expressed by the following equations 1 and 2, respectively. When the front wheel brake force Ff of the respective front wheels FL, FR and the rear wheel brake force Fr of the respective rear wheels RL, RR get larger, the anti-dive force Fad and the anti-lift force Fal become larger, and vice versa.

$$Fad = Ff \cdot \tan \theta f \qquad \text{Equation (1)}$$

$$Fal = Fr \cdot \tan \theta r \qquad \text{Equation (2)}$$

Furthermore, when the angle $\theta f$ and the angle $\theta r$ get larger, the anti-dive force Fad and the anti-lift force Fal become larger, and vice versa. Thereby, it is possible to obtain the anti-pitching geometry, which has the greater anti-pitching effect. Here, as discussed above, when an anti-pitching geometry, which shows an excessively large anti-pitching effect, is adapted, the ride feeling of the occupant(s) is disadvantageously deteriorated during the non-braking period, for example, at the time of traveling the rough road. Thus, in the present vehicle, the anti-pitching geometry, which exhibits a moderate or relatively small anti-pitching effect, is implemented by setting the relatively small angle θf and the relatively small angle θr.

In addition, in the present vehicle, each front wheel side suspension FS and each rear wheel side suspension RS (more specifically, the locations of the instantaneous centers Cf, Cr) are set to achieve the relation of θf<θr. Therefore, a change gradient (=tan θr) of the anti-lift force Fal (the degree of the anti-lift effect) relative to a change in the brake force Fr of the respective rear wheels RL, RR is larger than a change gradient (=tan θf) of the anti-dive force Fad (the degree of the anti-dive effect) relative to the brake force Ff of the respective front wheels FL, FR. In other words, when the amount of change in the brake force Ff of the respective front wheels FL, FR is the same as the amount of change in the brake force Fr of the respective rear wheels RL, RR, the amount of change in the anti-lift force Fal becomes larger than the amount of change in the anti-dive force Fad.

Now, a summary of a pitching limiting control operation upon starting the application of the brakes will be described.

In the present system, during the braking period (operating period of the brake pedal Bp), a brake force distribution (hereinafter, also referred to as "front-to-rear brake force distribution") between the front wheels FL, FR and the rear wheels RL, RR is normally adjusted to a basic distribution, which corresponds to a basic distribution curve shown in FIG. 3. In this basic distribution, the brake force of the respective rear wheels RL, RR is set to a relatively small level, which can limit occurrence of locking of the rear wheels before locking of the front wheels FL, FR.

Specifically, a target deceleration Gt is determined based on the brake pedal pressing force Fp, which is obtained by the pressing force sensor 42. Then, there is determined an intersecting point where an iso-acceleration line (iso-G line), which corresponds to this target deceleration Gt, intersects with the basic distribution curve. Thereafter, the hydraulic unit 30 controls the wheel cylinder hydraulic pressure of the respective front wheels FL, FR and the wheel cylinder pressure of the respective rear wheels RL, RR such that the brake force of the respective front wheels FL, FR and the brake force of the respective rear wheels RL, RR become the corresponding values, respectively, which are indicated at this intersecting point. Here, the wheel cylinder hydraulic pressure of the front left wheel FL and the wheel cylinder hydraulic pressure of the front right wheel FR are set to the same pressure. Also, the wheel cylinder hydraulic pressure of the rear left wheel RL and the wheel cylinder hydraulic pressure of the rear right wheel RR are set to the same pressure.

Figure 4A:
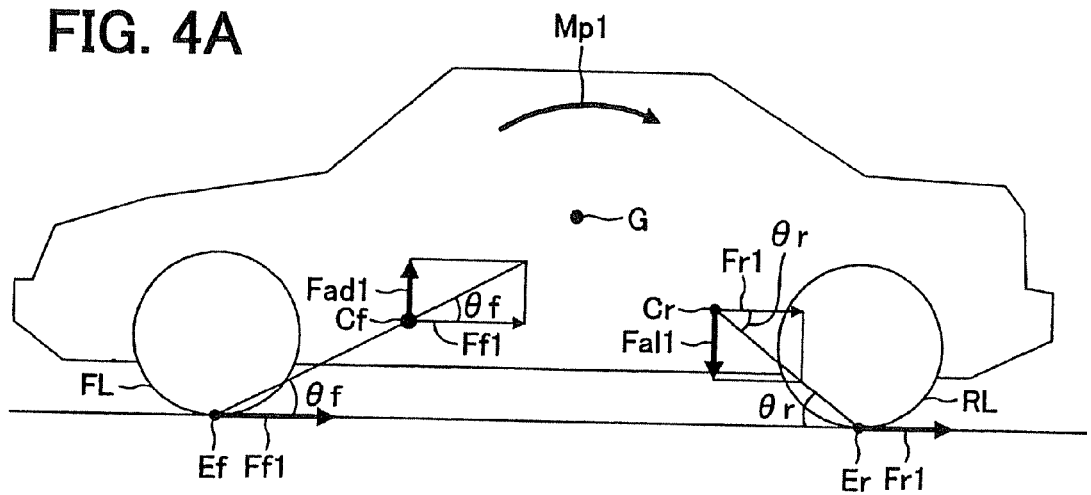
FIG. 4A is a schematic diagram showing an example of various forces and an anti-pitching moment in a case where a front-to-rear brake force distribution is adjusted to a constant setting at the basic distribution.

FIG. 4A shows an example where the front-to-rear brake force distribution is adjusted to a constant setting at this basic distribution. In this example, the brake force Ff of the respective front wheels FL, FR is set as Ff=Ff1, and the brake force Fr of the respective rear wheels RL, RR is set as Fr=Fr1. Also, the anti-dive force Fad is set as Fad=Fad1, and the anti-lift force Fal is set as Fal=Fal1. Furthermore, the anti-pitching moment MP is set as Mp=Mp1.

Figure 5A:
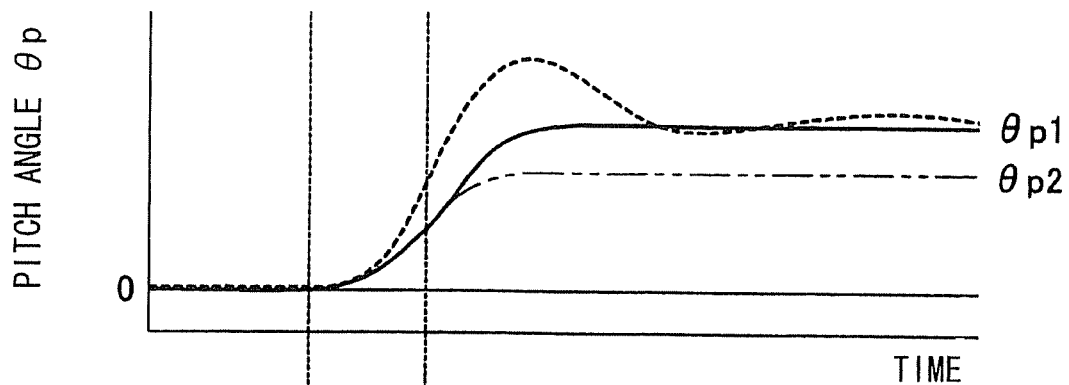
FIG. 5A is a diagram showing an exemplary change in a pitch angle for a case of the basic distribution, which is implemented throughout the application of brakes, and a case of the ideal distribution, which is implemented for a short period after starting of the application of the brakes.
Figure 5B:
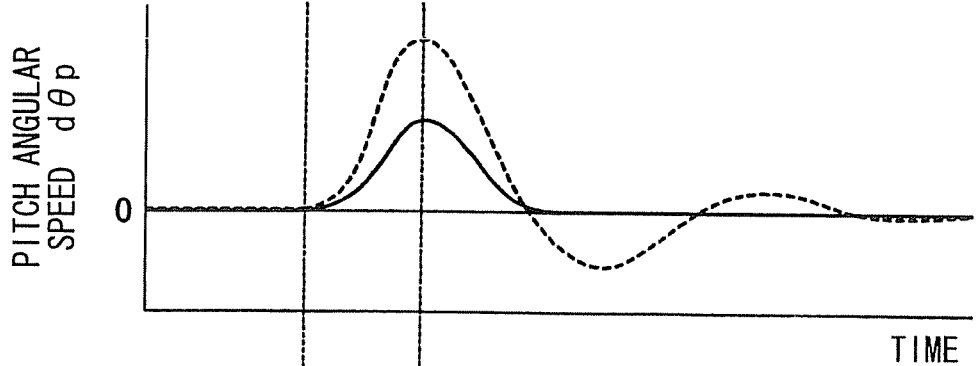
FIG. 5B is a diagram showing an exemplary change in a pitch angular speed in the case of the basic distribution and the case of the ideal distribution like FIG. 5A.
Figure 5C:
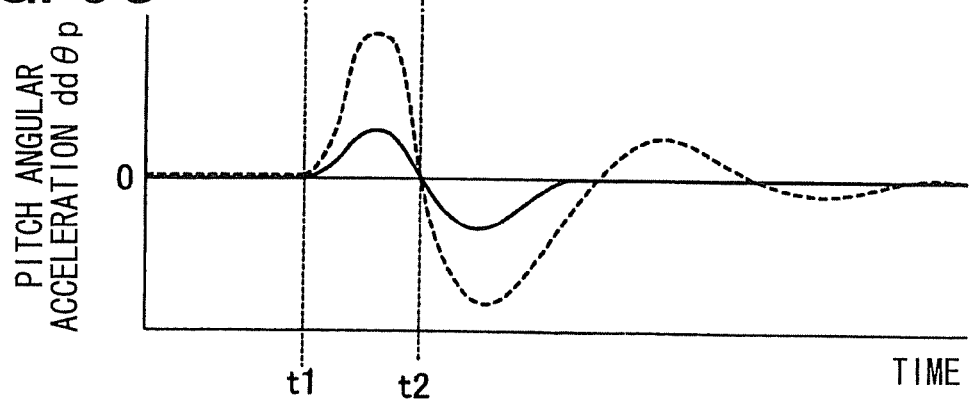
FIG. 5C is a diagram showing an exemplary change in a pitch angular acceleration in the case of the basic distribution and the case of the ideal distribution like in FIG. 5A.

FIGS. 5A to 5C show an example where the front-to-rear brake force distribution is adjusted to a constant setting at the basic distribution described above during the period of applying the brakes, and an abrupt operation (abrupt depression) of the brake pedal BP is executed at the time t1. Specifically, a dotted line of FIG. 5A shows an exemplary change in the pitch angle θp with time. A dotted line of FIG. 5B shows an exemplary change in a pitch angular speed dθp, which is a temporal differential value of the pitch angle θp, with time.

A dotted line of FIG. 5C shows an exemplary change in a pitch angular acceleration ddθp, which is a temporal differential value of the pitch angular speed dθp, with time. Here, it is assumed that the brake pedal pressing force Fp is changed in a stepwise manner from zero to a value Fp1 at the time t1 due to the abrupt operation of the brake pedal Bp. Furthermore, the following situation is assumed. That is, in the case where the front-to-rear brake force distribution is adjusted to the basic distribution, when the brake pedal pressing force Fp is kept constant at the value Fp1, the pitch angle θp finally converges to a value θp1.

After the time t1, the inertial force acts at the center of gravity G of the vehicle in the vehicle front direction (direction toward the front side of the vehicle body) due to the applying of the brakes, so that each front wheel side suspension FS makes its stroke toward a compression side where the front wheel side suspension FS is compressed, and each rear wheel side suspension RS makes its stroke toward an expansion side where the rear wheel side suspension RS is expanded or extended. Therefore, the vehicle body is tilted forward (i.e., the front side of the vehicle body being tilted downward), and the pitch angle θp is increased, as shown in FIG. 5A. During this process, as shown in FIG. 5C, the pitch angular acceleration ddθp shows a positive maximum value (peak value) right after the time t1 and then changes from the positive range ("+" range) to the negative range ("−" range) at the time t2, which is shortly after the time t1.

In this case, the pitch angle θp shows a relatively large overshoot. Thus, the convergence of the pitch angle θp to the value θp1 is delayed. This is due to the following reasons. That is, as described above, the present vehicle has the anti-pitching geometry, which shows the moderate or relatively small anti-pitching effect. As a result, the sufficient anti-pitching moment Mp cannot be generated. Therefore, the peak value of the pitch angular acceleration ddθp right after the time t1 becomes the large positive value. Thus, the pitch angular speed dθp (and thereby an increasing gradient of the pitch angle θp) right after the time t1 becomes also large, so that the pitch angle θp have the relatively large overshoot thereafter.

In order to limit occurrence of the overshoot of the pitch angle θp, it is effective to limit the peak value of the pitch angular acceleration ddθp to a relatively small positive value right after the starting of the application of the brakes. In order to limit the peak value of the pitch angular acceleration ddθp to the relatively small value, it is required to make the anti-pitching moment Mp to a larger value right after the starting of the application of the brakes.

Therefore, in the present system, when the abrupt application of the brakes is started, the front-to-rear brake force distribution is adjusted to a first distribution, at which the brake force applied to the respective rear wheels RL, RR is larger than that of the basic distribution, instead of the basic distribution throughout a time period between the time of starting of the braking and the time of changing of the pitch angular acceleration ddθp from the positive range to the negative range (i.e., the time period between the time t1 and the time t2). The control operation, which results in the adjustment of the front-to-rear brake force distribution to the first distribution, will be also referred to as "first pitching limiting control operation". An ideal distribution (distribution that corresponds to an ideal distribution curve shown in FIG. 3), which is the front-to-rear brake force distribution that corresponds to the case where the front wheels FL, FR and the rear wheels RL, RR lock simultaneously, is used as the first distribution.

Figure 4B:
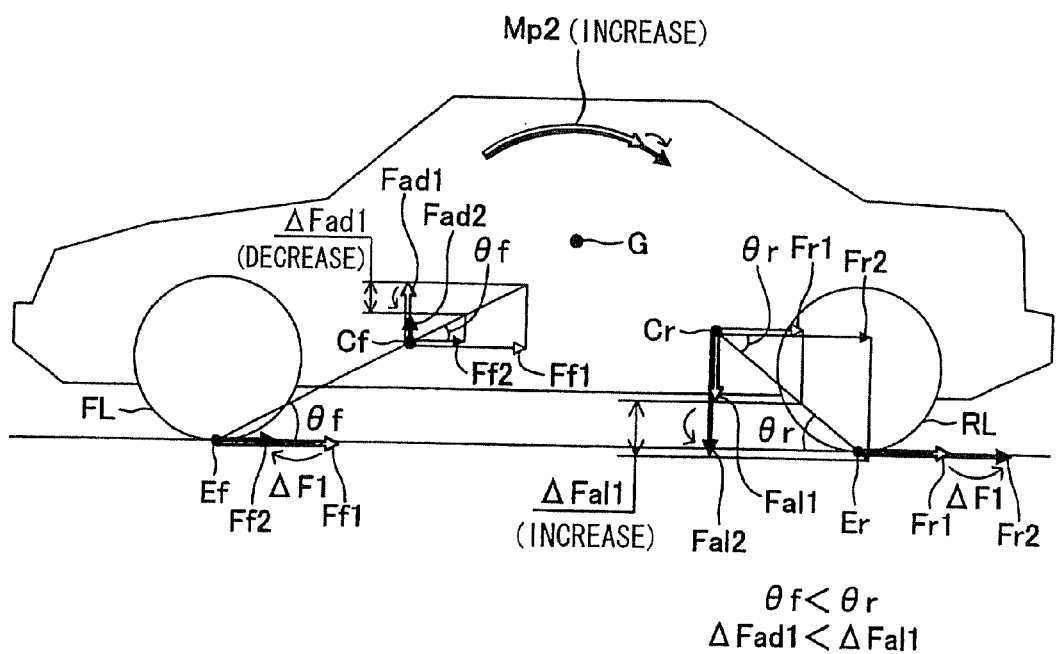
FIG. 4B is a schematic diagram showing various force and anti-pitching moment in a case where the front-to-rear brake force distribution in FIG. 4A is changed from the basic distribution to an ideal distribution.

FIG. 4B shows changes in the front wheel brake force Ff, the rear wheel brake force Fr, the anti-dive force Fad, the anti-lift force Fal and the anti-pitching moment Mp encountered at the time of changing the front-to-rear brake force distribution from the basic distribution to the ideal distribution in the example of FIG. 4A. In FIG. 4B, blank arrows are used to indicate the state in the basic distribution (the case that is the same as that of FIG. 4A), and the solid arrows are used to indicate the state in the ideal distribution.

In the case of the ideal distribution, a portion of the front wheel brake force Ff is transferred to the rear wheel brake force Fr, as compared with the case of the basic distribution. In the example shown in FIG. 4B, the front wheel brake force Ff is decreased by the amount ΔF1 from the value Ff1 to the value Ff2, and the rear wheel brake force Fr is increased by the amount of ΔF1 from the value Fr1 to the value Fr2. That is, a sum of the front wheel brake force Ff and the rear wheel brake force Fr is maintained to the same value as that of the case of the basic distribution. Furthermore, due to the decrease of the front wheel brake force Ff by the amount of ΔF1, the anti-dive force Fad is decreased from the value Fad1 to the value Fad2. Also, due to the increase of the rear wheel brake force Fr by the amount of ΔFL the anti-lift force Fal is increased from the value Fal1 to the value Fal2.

Here, as discussed above, due to the existence of the relationship of θf<θr, the amount of change in the anti-lift force Fal becomes larger than the amount of change in the anti-dive force Fad when the amount of change in the front wheel brake force is the same as the amount of change in the rear wheel brake force. Specifically, in the example of FIG. 4B, the amount of increase ΔFal1 (=Fal2−Fal1) in the anti-lift force Fal is larger than the amount of decrease ΔFad1 (=Fad1−Fad2) in the anti-dive force Fad. Therefore, when the entire vehicle is concerned, in the ideal distribution, the anti-pitching effect becomes large, and the anti-pitching moment Mp is increased from the value Mp1 to the value Mp2 in comparison to the case of the basic distribution. Thereby, it becomes difficult to increase the pitch angle θp.

A solid line shown in FIG. 5A indicates an exemplary change in the pitch angle θp in the case where the first pitching limiting control operation is executed through the time period between the time of starting the application of the brakes and the time of changing of the pitch angular acceleration ddθp from the positive range to the negative range (i.e., the time period between the time t1 and the time t2). A solid line shown in FIG. 5B indicates an exemplary change in the pitch angular speed dθp in the case where the first pitching limiting control operation is executed through the time period between the time t1 and the time t2. A solid line shown in FIG. 5C indicates an exemplary change in the pitch angular acceleration ddθp in the case where the first pitching limiting control operation is executed through the time period between the time t1 and the time t2.

In this case, the relatively large anti-pitching moment Mp may possibly be generated right after the time t1, so that the peak value of the pitch angular acceleration ddθp becomes the small positive value right after the time t1, as shown in FIG. 5C. Thus, the pitch angular speed dθp right after the time t1 (and thereby the increasing gradient of the pitch angle θp) becomes small. Thereby, the pitch angle θp does not show the overshoot thereafter, and the pitch angle θp converges to the value θp1 in the early stage.

In the present system, the end of the first pitching limiting control operation is set to the time of changing of the pitch angular acceleration ddθp from the positive range to the negative range (i.e., the time t2). Based on the various experiments and the simulations, it is confirmed that this can effectively accelerate the convergence of the pitch angle θp.

This may be due to the following reasons. First, by the time t2, at which the pitch angular acceleration ddθp is changed from the positive range to the negative range, the pitch angle θp has become the relatively large value. Thus, the amount of stroke of each front wheel side suspension FS and the amount of stroke of each rear wheel side suspension RS have also become the relatively large values. Thus, a force of a vehicle body support spring of each rear wheel side suspension RS, which is operated in the direction for increasing the pitch angle, is significantly reduced, and a force of a vehicle body support spring of each front wheel side suspension FS, which is operated in the direction for decreasing the pitch angle, is significantly increased. In this way, the anti-pitching effect is implemented. As a result, there is no substantial need for executing the first pitching limiting control operation for increasing the anti-pitching moment Mp after the time t2. Moreover, when the first pitching limiting control operation is kept after the time t2, the convergence of the pitch angle θp may be delayed.

Furthermore, in the case where the brake pedal pressing force Fp is kept constant at the value Fp1, when the front-to-rear brake force distribution is adjusted to the ideal distribution instead of the basic distribution, the pitch angle θp is converged to the value θp2 instead of the value θp1 (here, θp2<θp1). When the end of the first pitching limiting control operation is set to unduly late timing, the pitch angle θp is converged to the value θp2, as indicated by a dot-dot-dash line in FIG. 5A. In such a case, when the front-to-rear brake force distribution is returned to the basic distribution due to the ending of the first pitching limiting control operation, the pitch angle θp may be increased once again from the value θp2 to the value θp1. Thus, the pitch angle θp may possibly show the unnecessary disorder.

As described above, in the present system, when there is a high possibility of occurrence of the large disorder (overshoot) in the pitch angle θp upon the starting of the abrupt application of the brakes, the first pitching limiting control operation is executed to effectively limit the disorder of the pitch angle θp. The outline of the pitching limiting control operation (the first pitching limiting control operation) at the time of starting the application of the brakes has been described above.

Now, a summary of a pitching limiting control operation upon starting release of the brakes will be described.

In the present system, in addition to the first pitching limiting control operation described above, another pitching limiting control operation is also executed at the time of starting release of the brakes based on the principal, which is similar to that of the first pitching limiting control operation. FIGS. 6A to 7C correspond to FIGS. 4A to 5C.

Figure 6A:
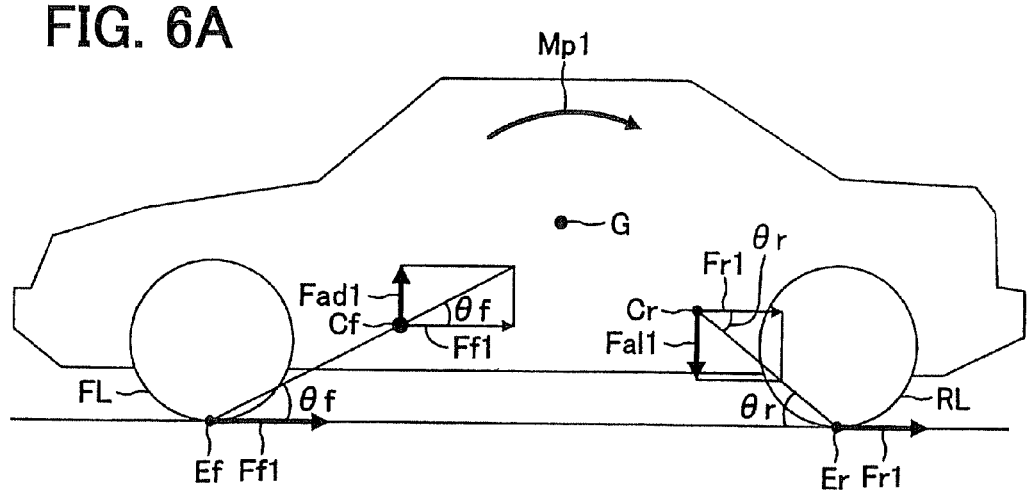
FIG. 6A is a schematic diagram showing an example of various forces and an anti-pitching moment in a case where the front-to-rear brake force distribution is adjusted to a constant setting at the basic distribution.

FIG. 6A shows an example where the front-to-rear brake force distribution is adjusted to a constant setting at the basic distribution, like in the example of FIG. 4A.

Figure 7A:
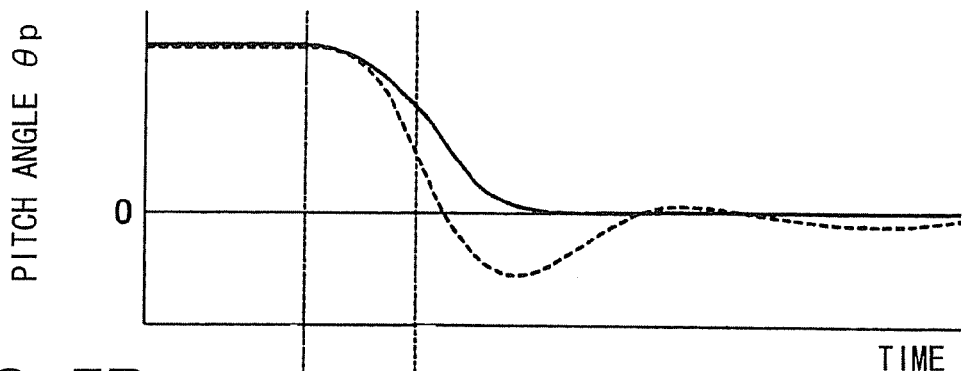
FIG. 7A is a diagram showing an exemplary change in a pitch angle for a case of the basic distribution, which is implemented throughout the application of brakes, and a case of the second distribution, which is implemented for a short period after starting of release of the brakes.
Figure 7B:
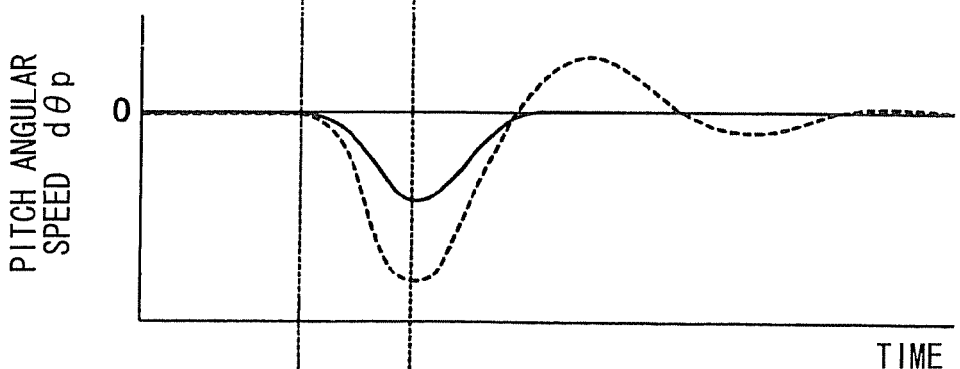
FIG. 7B is a diagram showing an exemplary change in a pitch angular speed in the case of the basic distribution and the case of the second distribution like FIG. 7A.
Figure 7C:
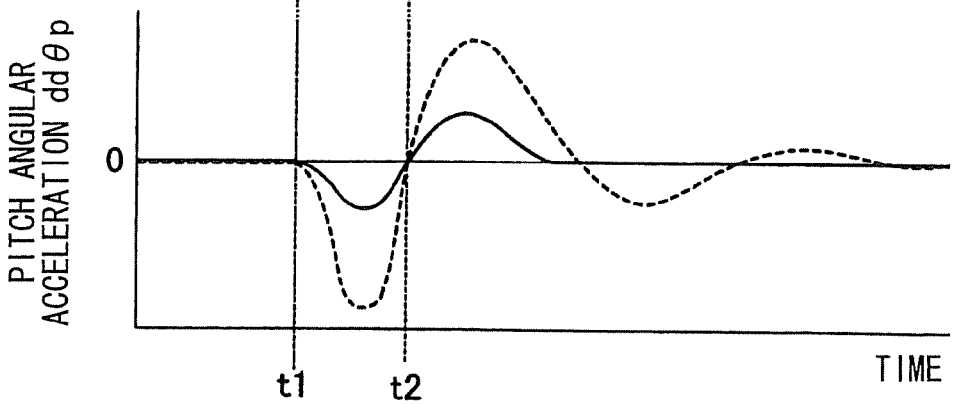
FIG. 7C is a diagram showing an exemplary change in a pitch angular acceleration in the case of the basic distribution and the case of the second distribution like in FIG. 7A.

FIGS. 7A to 7C show an example where the front-to-rear brake force distribution is adjusted to a constant setting at the basic distribution during the period of applying the brakes, and abrupt releasing of the brakes is executed at the time t1. Specifically, a dotted line of FIG. 7A shows an exemplary change in the pitch angle θp with time. A dotted line of FIG. 7B shows an exemplary change in a pitch angular speed dθp, which is a temporal differential value of the pitch angle θp, with time. A dotted line of FIG. 7C shows an exemplary change in a pitch angular acceleration ddθp, which is a temporal differential value of the pitch angular speed dθp, with time.

As indicted by the dotted line in FIG. 7A, the pitch angle θp is decreased from a certain value after the time t1 due to the releasing of the brakes. During this process, as shown in FIG. 7C, the pitch angular acceleration ddθp shows a negative minimum value (peak value) right after the time t1 and then changes from the negative range to the positive range at the time t2, which is shortly after the time t1.

In this case, the pitch angle θp shows a relatively large overshoot. Thus, the convergence of the pitch angle θp to zero (0) is delayed. This is due to the following reasons. That is, right after the starting the release of the brakes at the time t1, the brake force Ff of the respective front wheels FL, FR and the brake force Fr of the respective rear wheels RL, RR still exist, so that the anti-pitching moment Mp, which is based on the anti-dive force Fad and the anti-lift force Fal, still exist. This remaining anti-pitching moment Mp acts in the direction for promoting decreasing of the pitch angular acceleration ddθp right after the time t1. Therefore, the peak value of the pitch angular acceleration ddθp becomes the large negative value, the absolute value of which is large. Thus, the pitch angular speed dθp (negative value) right after the time t1 becomes the small value, the absolute value of which is large, and the decreasing gradient of the pitch angle θp also becomes the small value, the absolute value of which is large. As a result, the pitch angle θp shows a relatively large overshoot thereafter.

In order to limit occurrence of the overshoot of the pitch angle θp, it is effective to limit the peak value of the pitch angular acceleration ddθp to a corresponding negative value, the absolute value of which is small, right after the starting of the release of the brakes. In order to limit the peak value of the pitch angular acceleration ddθp to the negative value having the small absolute value, it is required to make the anti-pitching moment Mp to a smaller value right after the starting the release of the brakes.

Figure 3:
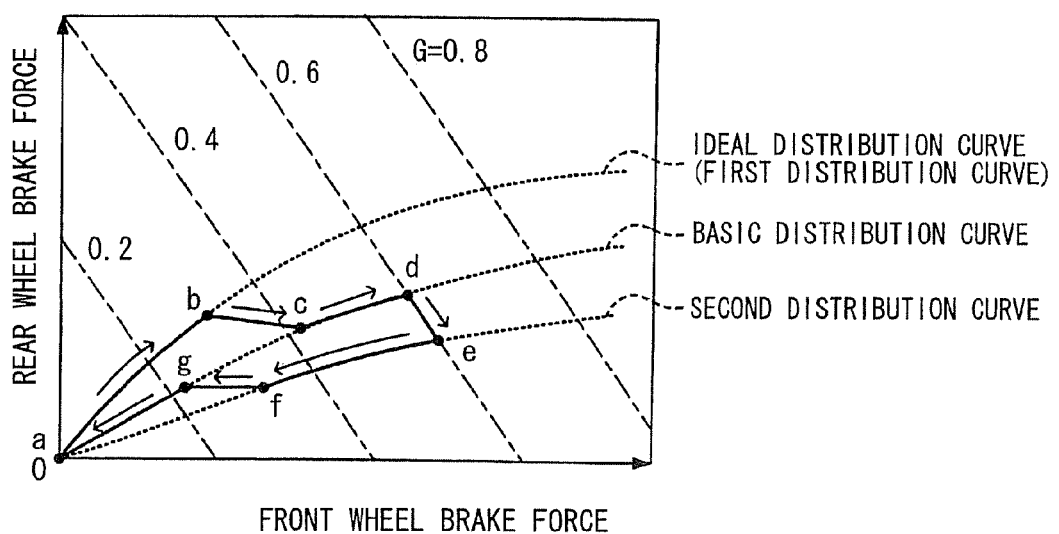
FIG. 3 is a diagram showing a basic distribution, an ideal distribution and a second distribution used as a control target for a front-to-rear wheel brake distribution.

Therefore, in the present system, when the abrupt release of the brakes is started, the front-to-rear brake force distribution is adjusted to a second distribution (a distribution that corresponds to a second distribution curve in FIG. 3), at which the brake force applied to the respective rear wheels RL, RR is smaller than that of the basic distribution, instead of the basic distribution throughout a time period between the time of starting the release of the brakes and the time of changing of the pitch angular acceleration ddθp from the negative range to the positive range (i.e., the time period between the time t1 and the time t2). Hereinafter, the control operation, which results in the adjustment of the front-to-rear brake force distribution to the second distribution, will be also referred to as "second pitching limiting control operation".

Figure 6B:
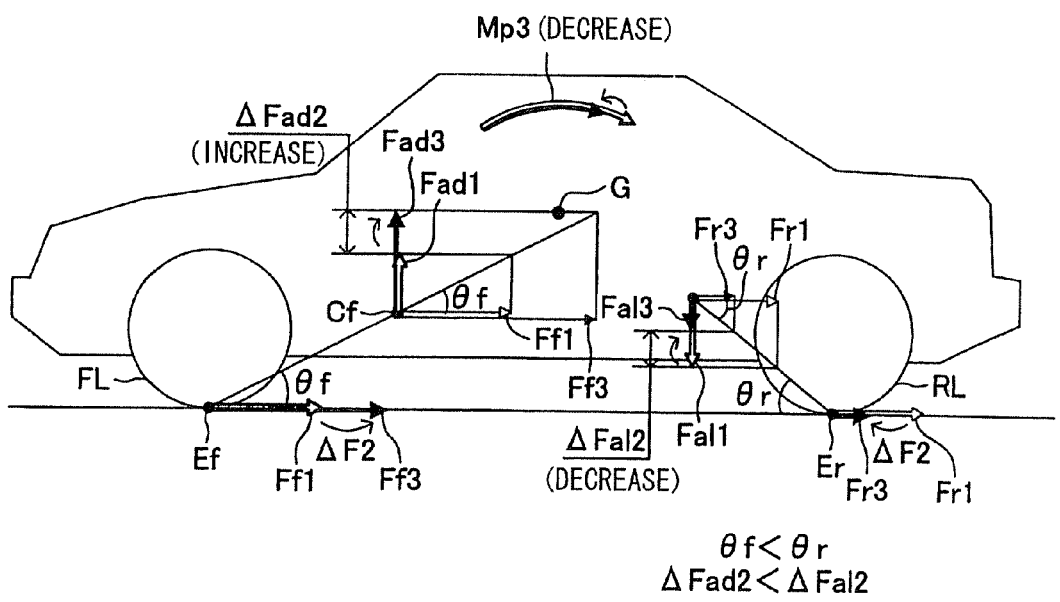
FIG. 6B is a schematic diagram showing various force and anti-pitching moment in a case where the front-to-rear brake force distribution in FIG. 6A is changed from the basic distribution to a second distribution.

FIG. 6B shows changes in the front wheel brake force Ff, the rear wheel brake force Fr, the anti-dive force Fad, the anti-lift force Fal and the anti-pitching moment Mp encountered at the time of changing the front-to-rear brake force distribution from the basic distribution to the second distribution in the example of FIG. 6A. In FIG. 6B, blank arrows are used to indicate the state in the basic distribution (the case that is the same as that of FIG. 6A), and the solid arrows are used to indicate the state in the second distribution.

In the case of the second distribution, a portion of the rear wheel brake force Fr is transferred to the front wheel brake force Ff in comparison to the case of the basic distribution. In the example shown in FIG. 6B, the rear wheel brake force Fr is decreased by the amount ΔF2 from the value Fr1 to the value Fr3, and the front wheel brake force Ff is increased by the amount of ΔF2 from the value Ff1 to the value Ff3. That is, a sum of the front wheel brake force Ff and the rear wheel brake force Fr is maintained to the same value as that of the case of the basic distribution. Furthermore, due to the increase of the front wheel brake force Ff by the amount of ΔF2, the anti-dive force Fad is increased from the value Fad1 to the value Fad3. Also, due to the decrease of the rear wheel brake force Fr by the amount of ΔF2, the anti-lift force Fal is decreased from the value Fal1 to the value Fal3.

Here, as discussed above, due to the satisfaction of the relation of θf<θr, in the example of FIG. 6B, the amount of decrease ΔFal2 (=Fal1−Fal3) in the anti-lift force Fal is larger than the amount of increase ΔFad2 (=Fad3−Fad1) in the anti-dive force Fad. Therefore, when the entire vehicle is concerned, in the second distribution, the anti-pitching effect becomes small, and the anti-pitching moment Mp is decreased from the value Mp1 to the value Mp3 in comparison to the case of the basic distribution. Thereby, it becomes difficult to decrease the pitch angle θp.

A solid line shown in FIG. 7A indicates an exemplary change in the pitch angle θp in the case where the second pitching limiting control operation is executed from the time of starting the release of the brakes to the time of changing of the pitch angular acceleration ddθp from the negative range to the positive range (i.e., the time period between the time t1 and the time t2). A solid line shown in FIG. 7B indicates an exemplary change in the pitch angular speed dθp in the case where the second pitching limiting control operation is executed through the time period between the time t1 and the time t2. A solid line shown in FIG. 7C indicates an exemplary change in the pitch angular acceleration ddθp in the case where the second pitching limiting control operation is executed through the time period between the time t1 and the time t2.

In this case, after the time t1, the anti-pitching moment Mp, which acts in the direction for promoting the decrease of the pitch angular acceleration ddθp, becomes the small value. Thus, as indicated by the solid line in FIG. 7C, the peak value of the pitch angular acceleration ddθp right after the time t1 becomes the negative value, the absolute value of which is small. Thus, the pitch angular speed dθp (negative value) right after the time t1 becomes the large value, the absolute value of which is small, and the decreasing gradient of the pitch angle θp also becomes the large value, the absolute value of which is small. Thereby, the pitch angle θp does not show the overshoot thereafter, and the pitch angle θp converges to zero in the early stage.

In the present system, the end of the second pitching limiting control operation is set to the time of changing of the pitch angular acceleration ddθp from the negative range to the positive range (i.e., the time t2). Based on the various experiments and the simulations, it is confirmed that this can effectively accelerate the convergence of the pitch angle θp.

This may be due to the following reasons. Specifically, by the time t2, at which the pitch angular acceleration ddθp is changed from the negative range to the positive range, the pitch angle θp has become the relatively small value. Thus, the amount of stroke of each front wheel side suspension FS and the amount of stroke of each rear wheel side suspension RS have also become the relatively small values. Thereby, the force of the vehicle body support spring of each rear wheel side suspension RS, which is operated in the direction for increasing the pitch angle, is significantly increased, and the force of the vehicle body support spring of each front wheel side suspension FS, which is operated in the direction for decreasing the pitch angle, is significantly decreased. In this way, the anti-pitching effect is not explicitly implemented. As a result, there is no substantial need for executing the second pitching limiting control operation for decreasing the anti-pitching moment Mp after the time t2. Moreover, when the second pitching limiting control operation is kept after the time t2, the convergence of the pitch angle θp may be delayed.

As described above, in the present system, when there is the high possibility of occurrence of the large disorder (overshoot) in the pitch angle θp upon the starting of the abrupt release of the brakes, the second pitching limiting control operation is executed to effectively limit the disorder of the pitch angle θp. The summary of the pitching effect limiting control operation at the time of starting the release of the brakes has been described above.

Next, the actual operation of the present system will be described in view of FIGS. 8 to 10, which show a flowchart of the routine executed by the CPU 51 of the controller 50, and also in view of FIG. 3.

Figure 8:
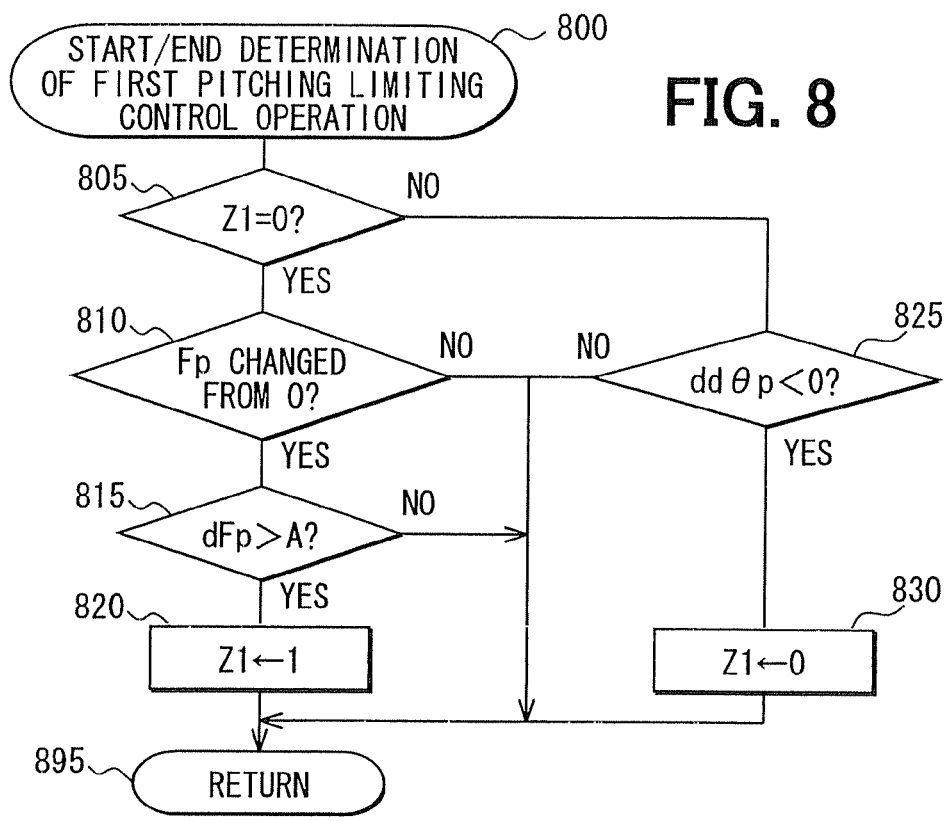
FIG. 8 is a flowchart showing a routine for making a start/end determination in a first pitching limiting control operation executed by a CPU shown in FIG. 1.

The CPU 51 repeats the routine for determining the start/end of the first pitching limiting control operation shown in FIG. 8 at predetermined time intervals (e.g., every 6 msec). Thus, at the predetermined timing, the CPU 51 starts the routine at step 800 and proceeds to step 805. At step 805, it is determined whether a value of a flag Z1 is "0" (zero). Here, when the value of the flag Z1 is "1", it indicates the first pitching limiting control operation is currently executed. In contrast, when the value of the flag Z1 is "0", it indicates that the first pitching limiting control operation is currently not executed.

In the case of Z1=0 (in the case of not currently executing the first pitching limiting control operation), the CPU 51 proceeds to step 810. At step 810, it is determined whether the brake pedal pressing force Fp is changed from zero to another value, i.e., it is determined whether the braking operation has started. When YES is returned at step 810, the CPU 51 proceeds to step 815. At step 815, it is determined whether an increasing rate dFp of the brake pedal pressing force Fp is larger than a predetermined value A. In other words, it is determined whether a rate of change in the amount of operation of the brake pedal BP for applying the front and rear wheel brake forces becomes larger than a predetermined rate. Specifically, at steps 810, 815, it is determined whether the abrupt application of the brakes has started.

When NO is returned at any one of steps 810, 815, the CPU 51 immediately proceeds to step 895 and terminates the current routine. In this case, the value of the flag Z1 is maintained to "0". In contrast, when YES is returned at steps 810, 815, the CPU 51 proceeds to step 820 and changes the value of the flag Z1 from "0" to "1".

On the other hand, in the case where the flag Z1=1 (i.e., in the case of currently executing the first pitching limiting control operation), NO is returned at step 805, and thereby the CPU 51 proceeds to step 825. At step 825, it is determined whether the pitch angular acceleration ddθp is changed from the positive range to the negative range. When NO is returned at step 825, the CPU proceeds to step 895 and terminates the current routine. In this case, the value of the flag Z1 is maintained to "1". The pitch angular acceleration ddθp is obtained by obtaining the pitch angle θp from the pitch angle sensor 43 and then temporally differentiating the obtained pitch angle θp twice. In contrast, when YES is returned at step 825, the CPU 51 proceeds to step 830 and changes the value of the flag Z1 from "1" to "0".

As described above, by repeating the routine of FIG. 8, when the abrupt application of the brakes is started in the case of the flag Z1=0, the value of the flag Z1 is changed from "0" to "1". Furthermore, when the pitch angular acceleration ddθp is changed from the positive range to the negative range in the case of the flag Z1=1, the value of the flag Z1 is changed from "1" to "0".

Figure 9:
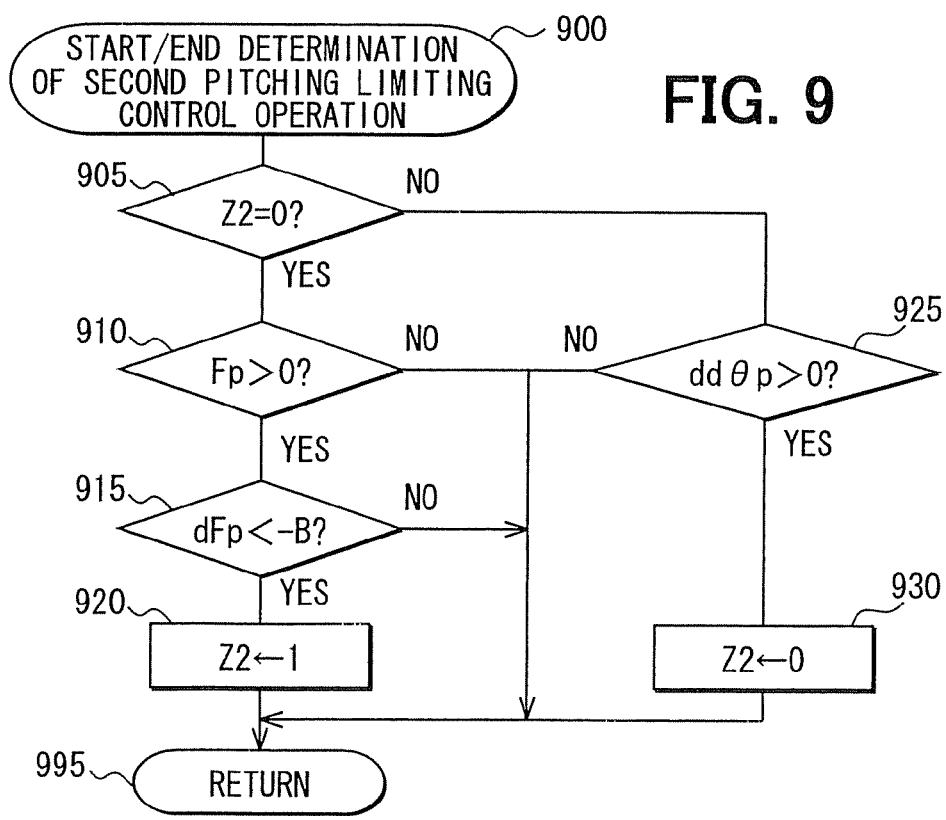
FIG. 9 is a flowchart showing a routine for making a start/end determination in a second pitching limiting control operation executed by the CPU shown in FIG. 1.

The CPU 51 repeats the routine for determining the start/end of the second pitching limiting control operation shown in FIG. 9 at predetermined time intervals (e.g., every 6 msec). The routine of FIG. 9 is similar to the routine of FIG. 8. Thus, the details of the routine of FIG. 9 will not be described for the sake of simplicity. Here, when the value of the flag Z2 is "1", it indicates the second pitching limiting control operation is currently executed. In contrast, when the value of the flag Z2 is "0", it indicates that the second pitching limiting control operation is currently not executed.

When the abrupt release of the brakes starts in the state of the flag Z2=0 by repeating the routine shown in FIG. 9, i.e., when the increasing rate dFp of the brake pedal pressing force Fp becomes negative and is smaller than the predetermined value (−B) during the application of the brakes (Fp>0), the value of the flag Z2 is changed from "0" to "1". In other words, when a rate of change in the amount of operation of the brake pedal BP for releasing the front and rear brake forces become larger than a predetermined rate, the value of the flag Z2 is changed from "0" to "1". In contrast, when the pitch angular acceleration ddθp is changed from the negative range to the positive range in the state of the flag Z2=1, the value of the flag Z2 is changed from "1" to "0".

The CPU 51 repeats the routine of the brake control operation shown in FIG. 10 at predetermined time intervals (e.g., every 6 msec). Thus, at the predetermined timing, the CPU 51 starts the operation step 1000 and then proceeds to step 1005. At step 1005, it is determined whether a condition of the flag Z1=flag Z2=0, i.e., whether all of the flags Z1, Z2 are set to "0".

Now, if it is right after the starting of the abrupt application of the brakes (see the point "a" in FIG. 3), the flags Z1, Z2 should be in the state of Z1=1 (see step 820) and Z2=0. In this case, NO is returned at step 1005, and the CPU 51 proceeds to step 1010 where it is determined whether the flag Z1 is 1 (i.e., Z1=1). Then, when YES is returned at step 1010, the CPU 51 proceeds to step 1015.

At step 1015, the CPU 51 executes the ideal distribution control operation. In this way, there is determined an intersecting point where an iso-acceleration line (iso-G line), which corresponds to the target deceleration Gt obtained based on the brake pedal pressing force Fp received from the pressing force sensor 42, intersects with the ideal distribution curve. Then, the hydraulic unit 30 controls the wheel cylinder hydraulic pressure of the respective front wheels FL, FR and the wheel cylinder hydraulic pressure of the respective rear wheels RL, RR such that the brake force Ff of the respective front wheels FL, FR and the brake force Fr of the respective rear wheels RL, RR become the corresponding values, respectively, which are indicated at this intersecting point. Therefore, the front-to-rear brake force distribution is adjusted to the ideal distribution. This step 1015 corresponds to a first distribution implementing means of the present invention.

The above process is executed repeatedly until the flag Z1 is set to "0" (i.e., the flag Z1=0). Thus, the front-to-rear brake force distribution is kept adjusted to the ideal distribution (i.e., maintaining the first pitching limiting control operation, see the point "a" to the point "b" in FIG. 3) until the pitch angular acceleration ddθp is changed from the positive range to the negative range.

When the pitch angular acceleration ddθp is changed from the positive range to the negative range (see the point "b" in FIG. 3), the flag Z1 is returned from "1" to "0" (see step 830). As a result, the condition of Z1=Z2=0 is satisfied, and thereby YES is returned at step 1005. Thereby, the CPU 51 proceeds to step 1020 where it is determined whether it is still within a predetermined time period from the time of changing the value of the flag Z1 from "1" to "0".

Here, the current time point in this state is right after the changing of the pitch angular acceleration ddθp from the positive range to the negative range, so that it is still within the above predetermined time period. Therefore, YES is returned at step 1020, and the CPU 51 proceeds to step 1025 where a first transition control operation is executed. The first transition control operation is a control operation for gradually returning the front-to-rear brake force distribution from the ideal distribution to the basic distribution.

This type of process is repeatedly executed until the end of the predetermined time period. Therefore, the first transition control operation is maintained until the end of the predetermined time period, so that the front-to-rear brake force distribution is gradually changed from the ideal distribution to the basic distribution (see the point "b" to the point "c" in FIG. 3).

When the predetermined time period is elapsed (see the point "c" in FIG. 3), NO is retuned at step 1020, and thereby the CPU 51 proceeds to step 1030. At step 1030, it is determined whether it is within a predetermined time period from the time of changing the value of the flag Z2 from "1" to "0".

At the current time point, NO is returned at step 1030, and thereby the CPU 51 proceeds to step 1035 where a basic distribution control operation is executed. Therefore, the front-to-rear brake force distribution is adjusted to the basic distribution. This step 1035 corresponds to a basic distribution implementing means of the present invention.

The above process is executed repeatedly until the condition of Z1=Z2=0 is no longer satisfied (i.e., until the start of the abrupt release of the brakes). Therefore, the front-to-rear brake force distribution is kept adjusted to the basic distribution until the start of the abrupt release of the brakes (see the point "c" to the point "d" in FIG. 3).

In this state, if it is right after the starting of the abrupt release of the brakes (see the point "d" in FIG. 3), the flag Z1 should be 0 (i.e., Z1=0), and the flag Z2 should be 1 (i.e., Z2=1) (see step 920). In this case, NO is returned at step 1005, so that the CPU 51 proceeds to step 1010, and NO is returned at step 1010. Thus, the CPU 51 proceeds to step 1040.

At step 1040, the CPU 51 executes a second distribution control operation. In this way, the front-to-rear brake force distribution is adjusted to the second distribution (see the point "e" in FIG. 3). This step 1040 corresponds to a second distribution implementing means of the present invention.

The above process is executed repeatedly until the flag Z2 is set to "0" (i.e., the flag Z2=0). Thus, the front-to-rear brake force distribution is kept adjusted to the second distribution (i.e., maintaining the second pitching limiting control operation, see the point "e" to the point "f" in FIG. 3) until the pitch angular acceleration ddθp is changed from the negative range to the positive range.

When the pitch angular acceleration ddθp is changed from the negative range to the positive range (see the point "f" in FIG. 3), the flag Z2 is returned from "1" to "0" (see step 930). Thus, the condition of Z1=Z2=0 is satisfied. Thereby, YES is returned once again at step 1005, so that the CPU 51 proceeds to step 1020, and NO is returned at step 1020. As a result, the CPU 51 proceeds to step 1030.

Here, the current time point in this state is right after the changing of the pitch angular acceleration ddθp from the negative range to the positive range, so that it is still within the above predetermined time period. Therefore, YES is returned at step 1030, and the CPU 51 proceeds to step 1045 where a second transition control operation is executed. The second transition control operation is a control operation for gradually returning the front-to-rear brake force distribution from the second distribution to the basic distribution.

This type of process is repeatedly executed until the end of the predetermined time period. Therefore, the second transition control operation is maintained until the end of the predetermined time period, so that the front-to-rear brake force distribution is gradually changed from the second distribution to the basic distribution (see the point "f" to the point "g" in FIG. 3).

When the predetermined time period is elapsed (see the point "g" in FIG. 3), NO is retuned at step 1030, and thereby the CPU 51 proceeds to step 1035. At step 1035, the CPU 51 executes the basic distribution control operation. Therefore, the front-to-rear brake force distribution is returned to the basic distribution (see the point "g" to the point "a" in FIG. 3).

Figure 11A:
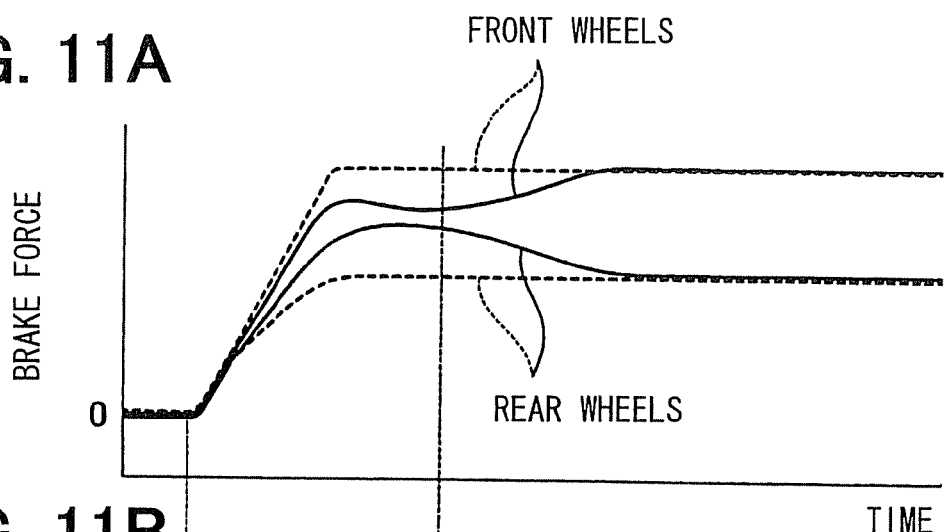
FIG. 11A is a diagram showing an exemplary change in a brake force of front wheels and an exemplary change in a brake force of rear wheels in a case of starting abrupt application of the brakes.
Figure 11B:
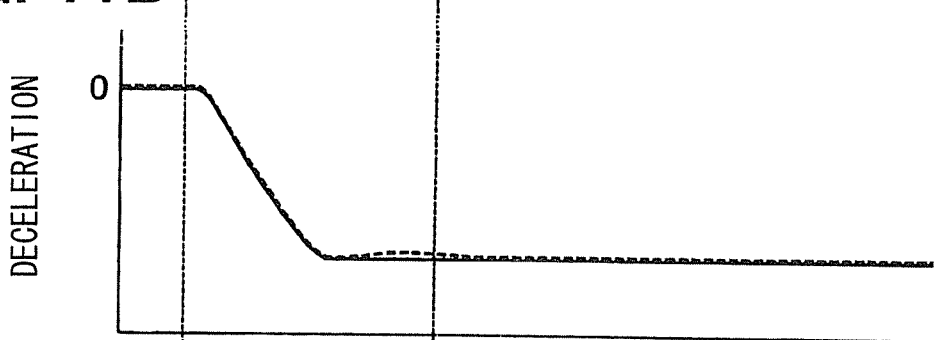
FIG. 11B is a diagram showing an exemplary change in a deceleration of a vehicle body in the case of starting the abrupt application of the brakes.
Figure 11C:
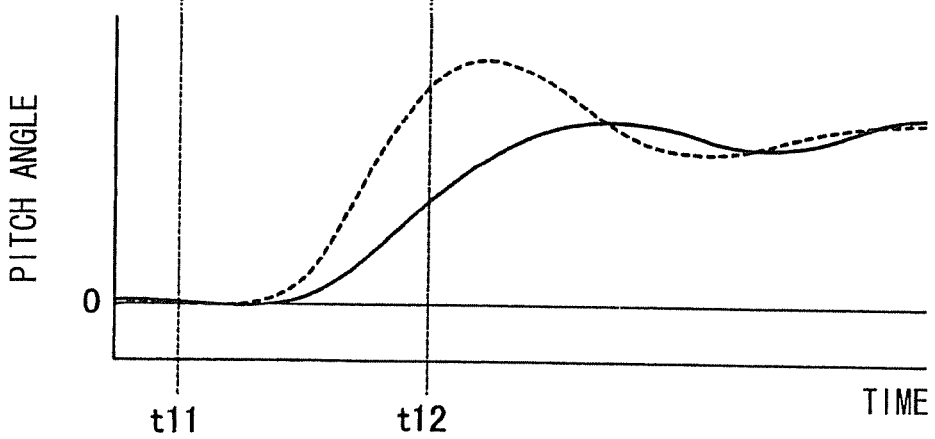
FIG. 11C is a diagram showing an exemplary change in a pitch angle in the case of starting the abrupt application of the brakes.

FIGS. 11A to 11C show an example where the abrupt application of the brakes is started at the time t11. More specifically, FIG. 11A shows an exemplary change in the brake force of the respective front wheels and the brake force of the respective rear wheels with time. FIG. 11B shows an exemplary change in the deceleration of the vehicle body with time. FIG. 11C shows an exemplary change in the pitch angle with time. A dotted line in each of FIGS. 11A to 11C shows a case where the basic distribution control operation is executed all the time during the period of applying the brakes. A solid line in each of FIGS. 11A to 11C shows a case where the brake control operation (specifically, the first pitching limiting control operation, the first transition control operation and the basic distribution control operation) of the present system is executed according to the flowcharts shown in FIGS. 8 to 10. In FIGS. 11A to 11C, during the period between the time t11 and the time t12, the first pitching limiting control operation is executed, and then the first transition control operation and the basic distribution control operation are executed sequentially.

As clearly understandable from FIGS. 11A to 11C, when the first pitching limiting control operation is executed, the increasing rate of the pitch angle is reduced, so that the overshoot of the pitch angle can be substantially limited (see the solid line). Furthermore, the sum of the front wheel brake force and the rear wheel brake force during the first pitching limiting control operation (i.e., the ideal distribution control operation) is maintained to the same value as that of the basic distribution control operation. Thus, even when the first pitching limiting control operation is executed, the deceleration of the vehicle body changes in the same manner as that of the basic distribution control operation. Therefore, the driver will not have any substantial uncomfortable deceleration feeling.

Figure 12A:
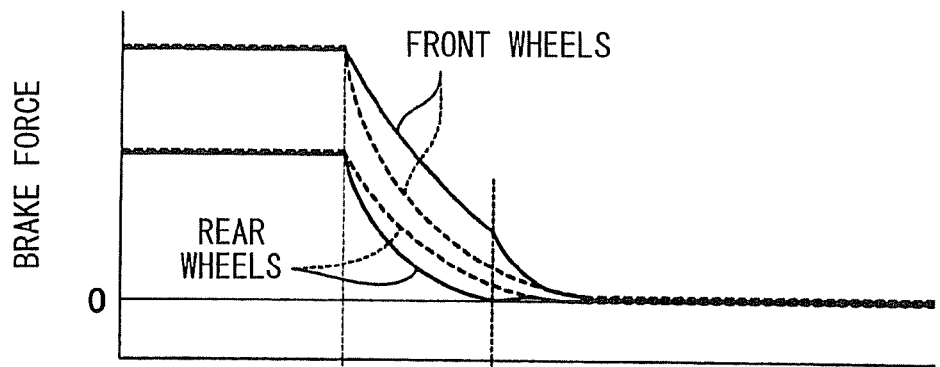
FIG. 12A is a diagram showing an exemplary change in a brake force of front wheels and an exemplary change in a brake force of rear wheels in a case of starting an abrupt release of the brakes.
Figure 12B:
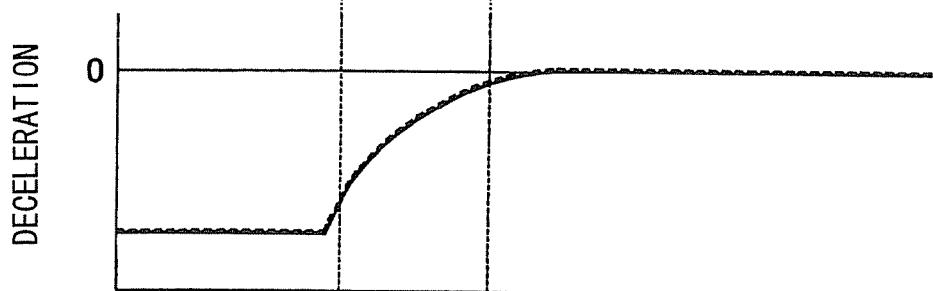
FIG. 12B is a diagram showing an exemplary change in a deceleration of a vehicle body in the case of starting the abrupt release of the brakes.
Figure 12C:
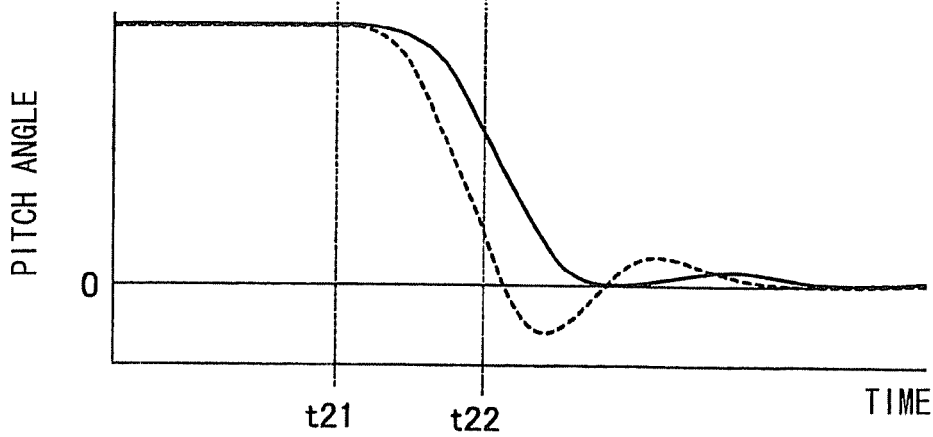
FIG. 12C is a diagram showing an exemplary change in a pitch angle in the case of starting the abrupt release of the brakes.

FIGS. 12A to 12C show an example where the abrupt release of brakes is started at the time t21. More specifically, FIG. 12A shows an exemplary change in the brake force of the respective front wheels and the brake force of the respective rear wheels with time. FIG. 12B shows an exemplary change in the deceleration of the vehicle body with time. FIG. 12C shows an exemplary change in the pitch angle with time. A dotted line in each of FIGS. 12A to 12C shows a case where the basic distribution control operation is executed all the time during the period of applying the brakes. A solid line in each of FIGS. 12A to 12C shows a case where the brake control operation (specifically, the second pitching limiting control operation, the second transition control operation and the basic distribution control operation) of the present system is executed according to the flowcharts shown in FIGS. 8 to 10. In FIGS. 12A to 12C, the basic distribution control operation is executed before the time t21. Thereafter, during the period between the time t21 and the time t22, the second pitching limiting control operation is executed, and then the second transition control operation and the basic distribution control operation are executed sequentially.

As clearly understandable from FIGS. 12A to 12C, when the second pitching limiting control operation is executed by the present system, the decreasing rate of the pitch angle is reduced, so that the overshoot of the pitch angle can be substantially limited (see the solid line). Furthermore, the sum of the front wheel brake force and the rear wheel brake force during the second pitching limiting control operation (i.e., the second distribution control operation) is maintained to the same value as that of the basic distribution control operation. Thus, even when the second pitching limiting control operation is executed, the deceleration of the vehicle body changes in the same manner as that of the basic distribution control operation. Therefore, the driver will not have any substantial uncomfortable deceleration feeling.

As described above, the vehicle motion control system of the present embodiment is applied to the vehicle that has the front wheel side suspensions FS having the anti-dive geometry and the rear wheel side suspensions RS having the anti-dive geometry. The front wheel side suspensions FS and the rear wheel side suspensions RS are designed such that the anti-lift effect of the anti-lift geometry is larger than the anti-dive effect of the anti-dive geometry. Normally, the front-to-rear brake force distribution is adjusted to the basic distribution during the allocation of the brakes. In contrast, when the abrupt application of the brakes is started, the front-to-rear brake force distribution is adjusted to the first distribution (=the ideal distribution), at which the brake force applied to the respective rear wheels RL, RR is larger than that of the basic distribution, instead of the basic distribution during the predetermined short period from the time of starting the application of the brakes. In this way, the amount of increase in the anti-lift effect becomes larger than the amount of decrease in the anti-dive effect, so that the anti-pitching moment of the entire vehicle is increased.

As a result, when the pitch angle shows the large disorder after the starting of the abrupt application of the brakes, the increase in the pitch angle is limited by increasing the anti-pitching effect without providing a special mechanism in the suspensions. Thus, the suspensions, which have the anti-pitching geometries that do not have the large anti-pitching effect, are adapted, so that the good ride feeling is maintained during the non-braking period (non-operating period of the brake pedal BP), and the pitching (the disorder of the pitching angle) is advantageously limited during the braking period.

Furthermore, in this case, the ideal distribution is used as the first distribution. In this way, the amount of increase in the anti-pitching effect can be maximized by changing from the basic distribution to the first distribution within the range, in which there exists the high probability of occurrence of the locking of the rear wheels before the locking of the front wheels due to the change from the basic distribution to the first distribution.

In addition, when the abrupt release of the brakes is started during the application of the brakes, the front-to-rear brake force distribution is adjusted to the second distribution, at which the brake force applied to the respective rear wheels RL, RR is smaller than that of the basic distribution, in place of the basic distribution only during the predetermined short period from the time of starting the release of the brakes. In this way, the amount of decrease in the anti-lift effect becomes larger than the amount of increase in the anti-dive effect, so that the anti-pitching moment of the entire vehicle is decreased.

As a result, when the pitch angle shows the large disorder after the starting of the abrupt release of the brakes, the decrease in the pitch angle is limited by decreasing the anti-pitching effect without providing the special mechanism in the suspensions. Therefore, the pitching (the disorder of the pitch angle) can be effectively limited at the time of releasing the brakes.

The present invention is not limited to the above embodiment, and the above embodiment may be modified in various ways within the scope of the present invention. For example, in the above embodiment, "the time of occurrence of the change in the pitch angular acceleration $dd\theta p$ from the positive range to the negative range", which is the end of the first pitching limiting control operation (i.e., the ideal distribution control operation), and "the time of occurrence of the change in the pitch angular acceleration $dd\theta p$ from the negative range to the positive range", which is the end of the second pitching limiting control operation (i.e., the second distribution control operation), are determined based on the pitch angular acceleration $dd\theta p$, which is obtained by temporarily differentiating the pitch angle $\theta p$ obtained from the pitch angle sensor 43 twice (see steps 825, 925). Alternatively, in place of the pitch angle sensor 43, a pitch angular speed sensor may be used, and a pitch angular acceleration, which is obtained by temporarily differentiating the pitch angular speed obtained by the pitch angular speed sensor only once, may be used to determine the end of the first pitching limiting control operation and the end of the second pitching limiting control operation. Furthermore, for this purpose, it is possible to use a pitch angular acceleration that is obtained based on the measurements of vehicle body height sensors, which are provided to the vehicle body front side and the vehicle body rear side.

Also, the time period between the time of starting the abrupt application of the brakes and "the time of occurrence of the change in the pitch angular acceleration $dd\theta p$ from the positive range to the negative range" as well as the time period between the time of starting the abrupt release of the brakes and "the time of occurrence of the change in the pitch angular acceleration $dd\theta p$ from the negative range to the positive range" may be estimated in advance according to an eigenfrequency in the pitching direction of the vehicle body, which is obtained based on the design specifications of the vehicle body. Thus, each of the duration time period of the first pitching limiting control operation and the duration time period of the second pitching limiting control operation may be set to a corresponding predetermined time period, which is determined based on the above eigenfrequency.

Furthermore, in the above embodiment, the ideal distribution is used as the first distribution. Alternatively, in place of the ideal distribution, another distribution, at which the brake force of the respective rear wheels is smaller than that of the ideal distribution (and also at which the brake force of the respective rear wheels is larger than that of the basic distribution) may be used as the first distribution.

Furthermore, in the above embodiment, as the second distribution, it is also possible to use another distribution, at which the brake force of the respective rear wheels is smaller than that of the basic distribution, and also at which the brake force of the respective rear wheels becomes smaller as the increasing rate dFp (the negative value) of the brake pedal pressing force Fp at the time of starting the release of the brakes gets smaller (i.e., the absolute value of the increasing rate dFp gets larger).

Also, in the above embodiment, the distribution, at which the brake force of the respective rear wheels is smaller than that of the ideal distribution, is used as the basic distribution. Alternatively, the distribution, which is the same as the ideal distribution, may be used as the basic distribution. In such a case, a distribution, at which the brake force of the respective rear wheels is larger than that of the ideal distribution, is used as the first distribution. Further alternatively, a distribution, at which the brake force of the respective rear wheels is smaller than that of the ideal distribution, may be used as the basic distribution, and a distribution, at which the brake force of the respective rear wheels is equal to or larger than that of the ideal distribution, may be used as the first distribution.

Furthermore, in the above embodiment, the condition of steps 810, 815 is used as the condition for starting the first pitching limiting control operation. Alternatively, the condition for starting the first pitching limiting control operation may include an additional condition of that the vehicle is currently traveling. Similarly, in the above embodiment, the condition of steps 910, 915 is used as the condition for starting the second pitching limiting control operation. Alternatively, the condition for starting the second pitching limiting control operation may include an additional condition of that the vehicle is currently traveling. The determination of whether the vehicle is currently traveling may be made based on whether the vehicle speed, which is obtained based on the measurements of the wheel speed sensors 41*fl*, 41*fr*, 41*rl*, 41*rr*, is zero.

In addition, in the above embodiment, the brake-by-wire system is used as the brake control apparatus. Alternatively, as the brake control apparatus, it is possible to use a pressure adjustable system, in which the master cylinder pressure itself is supplied to the respective wheel cylinders during the non-control time period, and in which the respective wheel cylinder pressures are adjusted to a corresponding different pressure that is different from the master cylinder pressure during the control time period. In such a case, the brake device (e.g., a brake pad, a brake disk) of each wheel is designed to achieve the basic distribution as the front-to-rear brake distribution during the non-control time period, and the respective wheel cylinder pressures are adjusted to the corresponding different pressure, which is different from the master cylinder pressure, only during the first and second pitching limiting control operations to achieve the first and second distributions.

In the above embodiment, the front left and right independent suspensions FS and the rear left and right independent suspensions RS are used. However, the present invention is not limited to this suspension system. In other words, a single front suspension, which supports the front left and right wheels and have the anti-dive geometry, and/or a single rear suspension, which supports the rear left and right wheels and have the anti-lift geometry, may be alternatively used as the suspension system of the present invention.

In the above embodiment, the pressing force sensor 42 is used to determine the time of starting the abrupt application of the brakes and the time of starting the abrupt release of the brakes based on the brake force measured with the pressing force sensor 42. In place of the pressing force sensor 42, a well known stroke sensor may be used to measure the amount of operation of the brake pedal Bp and thereby to determine the time of starting the abrupt application of the brakes and the time of starting the abrupt release of the brakes.

Additional advantages and modifications will readily occur to those skilled in the art. The invention in its broader terms is therefore not limited to the specific details, representative apparatus, and illustrative examples shown and described.

The invention claimed is:

1. A motion control system for a vehicle, comprising:
at least one front wheel side suspension that is provided to a plurality of front wheels of the vehicle and has an anti-dive geometry;
at least one rear wheel side suspension that is provided to a plurality of rear wheels of the vehicle and has an anti-lift geometry, wherein a change in a degree of an anti-lift effect of the anti-lift geometry relative to a change in a rear wheel brake force respectively applied to the plurality of rear wheels is larger than a change in a degree of an anti-dive effect of the anti-dive geometry relative to a change in a front wheel brake force respectively applied to the plurality of front wheels;
a brake control apparatus that is operable to independently apply and control the front wheel brake force and the rear wheel brake force;
a basic distribution implementing means for controlling the brake control apparatus during operation of a brake operating member of the vehicle by a driver, wherein the basic distribution implementing means controls the brake control apparatus such that a sum of the front wheel brake force and the rear wheel brake force becomes a demanded value, which corresponds to an amount of operation of the brake operating member by the driver, and a brake force distribution between the plurality of front wheels and the plurality of rear wheels becomes a basic distribution, wherein the basic distribution is one of:
a distribution, which is equal to an ideal distribution that implements simultaneous locking of the plurality of front wheels and the plurality of rear wheels; and
a distribution, at which the rear wheel brake force is smaller than that of the ideal distribution; and
at least one of a first distribution control means and a second distribution control means, wherein:
the first distribution control means is for controlling the brake control apparatus such that the sum of the front wheel brake force and the rear wheel brake force becomes the demanded value, and the brake force distribution between the plurality of front wheels and the plurality of rear wheels becomes a first distribution, at which the rear wheel brake force is larger than that of the basic distribution;
the first distribution control means starts the controlling of the brake control apparatus when a rate of change in the amount of operation of the brake operating member for applying the front and rear wheel brake forces becomes larger than a predetermined rate;
the first distribution control means terminates the controlling of the brake control apparatus when an angular acceleration of a pitch angle of a vehicle body of the vehicle is changed from a positive range to a negative range;
the pitch angle of the vehicle body is defined such that when a front side of the vehicle body is tilted downward, the pitch angle of the vehicle body is in the positive range;
the second distribution control means is for controlling the brake control apparatus such that the sum of the front wheel brake force and the rear wheel brake force becomes the demanded value, and the brake force distribution between the plurality of front wheels and the plurality of rear wheels becomes a second distribution, at which the rear wheel brake force is smaller than that of the basic distribution;
the second distribution control means starts the controlling of the brake control apparatus when a rate of change in the amount of operation of the brake operating member for releasing the front and rear brake forces becomes larger than a predetermined rate;
the second distribution control means terminates the controlling of the brake control apparatus when the angular acceleration of the pitch angle of the vehicle body is changed from the negative range to the positive range.

2. The motion control system according to claim 1, wherein:
the anti-dive geometry of the at least one front wheel side suspension is set such that an instantaneous center of motion of each front wheel relative to the vehicle body caused by a stroke of the at least one front wheel side suspension is located at a point, which is on an upper side of a ground contact point of the front wheel and is on a vehicle body rear side of the ground contact point of the front wheel, as viewed from a lateral side of the vehicle body; and
the anti-lift geometry of the at least one rear wheel side suspension is set such that an instantaneous center of motion of each rear wheel relative to the vehicle body caused by a stroke of the at least one rear wheel side suspension is located at a point, which is on an upper side of a ground contact point of the rear wheel and is on a vehicle body front side of the ground contact point of the rear wheel, as viewed from the lateral side of the vehicle body.

3. The motion control system according to claim 1, wherein the motion control system includes the first distribution control means.

4. The motion control system according to claim 3, wherein:
the basic distribution is set such that the rear wheel brake force is smaller than that of the ideal distribution; and
the first distribution is set to be equal to the ideal distribution, or is set to a distribution, at which the rear wheel brake force is larger than that of the ideal distribution.

5. The motion control system according to claim 1, wherein the motion control system includes the second distribution control means.

6. The motion control system according to claim 1, wherein the motion control system includes both of the first distribution control means and the second distribution control means.

* * * * *